(12) United States Patent
Perlman

(10) Patent No.: US 7,386,129 B2
(45) Date of Patent: Jun. 10, 2008

(54) SYSTEM AND METHOD FOR MULTIMEDIA CONTENT SIMULCAST

(75) Inventor: Stephen G. Perlman, Palo Alto, CA (US)

(73) Assignee: Digeo, Inc., Kirkland, WA (US)

( * ) Notice: Subject to any disclaimer, the term of this patent is extended or adjusted under 35 U.S.C. 154(b) by 958 days.

(21) Appl. No.: 09/871,415

(22) Filed: May 30, 2001

(65) Prior Publication Data
US 2002/0184506 A1    Dec. 5, 2002

(51) Int. Cl.
H04N 7/167 (2006.01)
H04N 7/16 (2006.01)
H04L 9/00 (2006.01)

(52) U.S. Cl. .................. 380/212; 380/200; 380/203; 380/217; 380/232; 380/239; 713/163; 713/165; 713/166; 726/28; 726/29; 705/51; 705/54; 705/57; 705/59

(58) Field of Classification Search ............ 380/12, 380/201–203, 217, 241
See application file for complete search history.

(56) References Cited

U.S. PATENT DOCUMENTS

| | | |
|---|---|---|
| 4,944,008 A | 7/1990 | Piosenka et al. |
| 5,001,753 A | 3/1991 | Davio et al. ............... 380/29 |
| 5,146,325 A | 9/1992 | Ng |
| 5,230,019 A | 7/1993 | Yanagimichi et al. |
| 5,303,295 A * | 4/1994 | West et al. ............... 380/208 |
| 5,371,551 A | 12/1994 | Logan et al. |
| 5,444,491 A | 8/1995 | Lim |
| 5,453,796 A | 9/1995 | Duffield et al. |
| 5,495,246 A | 2/1996 | Nichols et al. |
| 5,497,187 A * | 3/1996 | Banker et al. .............. 725/144 |
| 5,504,816 A * | 4/1996 | Hamilton et al. ........... 380/217 |

(Continued)

FOREIGN PATENT DOCUMENTS

EP     0 346 700 A    12/1989

(Continued)

OTHER PUBLICATIONS

Huang et al, Practical Key Distribution Schemes for Channel Protection, 2000, IEEE, pp. 569-574.*

(Continued)

*Primary Examiner*—Ayaz Sheikh
*Assistant Examiner*—Aravind K Moorthy
(74) *Attorney, Agent, or Firm*—Kory D. Christensen; Stoel Rives LLP

(57) ABSTRACT

A computer-implemented method is described for processing multimedia channels comprising: encrypting a first group of multimedia channels using a first type of encryption to produce a first group of encrypted multimedia channels; encrypting the first group of multimedia channels using a second type of encryption to produce a second group of encrypted multimedia channels; concurrently transmitting the first group of encrypted multimedia channels with the second group of multimedia channels to a plurality of multimedia subscribers having multimedia receivers capable of decrypting the first group of encrypted multimedia channels and/or the second group of multimedia channels.

Also described is a method comprising: receiving a plurality of channels from content providers at a cable headend; simulcasting premium cable channels to a plurality of subscribers in both a first encrypted format and a second encrypted format; and tran smitting non-premium channels to the plurality of subscribers in a non-encrypted format.

20 Claims, 22 Drawing Sheets

U.S. PATENT DOCUMENTS

| | | | |
|---|---|---|---|
| 5,515,373 A | 5/1996 | Lynch et al. | |
| 5,533,123 A * | 7/1996 | Force et al. | 713/189 |
| 5,574,964 A | 11/1996 | Hamlin | |
| 5,584,023 A | 12/1996 | Hsu | |
| 5,627,539 A | 5/1997 | Lynch et al. | |
| 5,631,651 A | 5/1997 | Nichols et al. | |
| 5,634,074 A | 5/1997 | Devon et al. | |
| 5,650,831 A | 7/1997 | Farwell | |
| 5,721,727 A | 2/1998 | Ashi | |
| 5,721,827 A | 2/1998 | Logan et al. | |
| 5,727,233 A | 3/1998 | Lynch et al. | |
| 5,732,216 A | 3/1998 | Logan et al. | |
| 5,734,589 A | 3/1998 | Kostreski et al. | |
| 5,734,862 A | 3/1998 | Kulas | |
| 5,796,829 A * | 8/1998 | Newby et al. | 705/54 |
| 5,799,190 A | 8/1998 | Lynch et al. | |
| 5,818,935 A * | 10/1998 | Maa | 380/200 |
| 5,819,298 A | 10/1998 | Wong et al. | |
| 5,838,873 A | 11/1998 | Blatter et al. | |
| 5,862,220 A | 1/1999 | Perlman | |
| 5,870,477 A | 2/1999 | Sasaki et al. | |
| 5,883,869 A | 3/1999 | Tamai et al. | |
| 5,892,536 A | 4/1999 | Logan et al. | |
| 5,896,444 A | 4/1999 | Perlman et al. | |
| 5,918,013 A | 6/1999 | Mighdoll et al. | |
| 5,931,949 A | 8/1999 | Perlman et al. | |
| 5,938,748 A | 8/1999 | Lynch et al. | |
| 5,940,073 A | 8/1999 | Klosterman | |
| 5,953,418 A * | 9/1999 | Bock et al. | 380/240 |
| 5,963,909 A | 10/1999 | Warren et al. | |
| 5,978,381 A | 11/1999 | Perlman et al. | |
| 5,983,273 A | 11/1999 | White et al. | |
| 5,986,692 A | 11/1999 | Logan et al. | |
| 6,005,938 A | 12/1999 | Banker et al. | |
| 6,014,693 A | 1/2000 | Ito et al. | |
| 6,014,694 A | 1/2000 | Aharoni et al. | |
| 6,023,585 A | 2/2000 | Perlman et al. | |
| 6,026,079 A | 2/2000 | Perlman | |
| 6,031,576 A | 2/2000 | Kuykendall, Jr. | |
| 6,044,396 A | 3/2000 | Adams | |
| 6,049,694 A | 4/2000 | Kassatly | |
| 6,072,872 A | 6/2000 | Chang et al. | |
| 6,073,168 A | 6/2000 | Mighdoll et al. | |
| 6,084,583 A | 7/2000 | Gerszberg et al. | |
| 6,088,455 A | 7/2000 | Logan et al. | |
| RE36,801 E | 8/2000 | Logan et al. | |
| 6,108,422 A | 8/2000 | Newby et al. | |
| 6,118,498 A | 9/2000 | Reitmeier | |
| 6,134,590 A | 10/2000 | Perlman | |
| 6,138,147 A | 10/2000 | Weaver et al. | |
| 6,141,356 A | 10/2000 | Gorman | |
| 6,141,693 A | 10/2000 | Perlman et al. | |
| 6,154,206 A * | 11/2000 | Ludtke | 713/168 |
| 6,169,879 B1 | 1/2001 | Perlman | |
| 6,188,397 B1 | 2/2001 | Humpleman | |
| 6,195,751 B1 * | 2/2001 | Caronni et al. | 713/163 |
| 6,199,076 B1 | 3/2001 | Logan et al. | |
| 6,199,114 B1 | 3/2001 | White et al. | |
| 6,226,241 B1 | 5/2001 | D'Amato et al. | |
| 6,229,895 B1 * | 5/2001 | Son et al. | 380/200 |
| 6,233,389 B1 | 5/2001 | Barton et al. | |
| 6,236,727 B1 * | 5/2001 | Ciacelli et al. | 380/212 |
| 6,256,733 B1 * | 7/2001 | Thakkar et al. | 713/156 |
| 6,304,659 B1 * | 10/2001 | Gold et al. | 380/239 |
| 6,351,538 B1 * | 2/2002 | Uz | 380/201 |
| 6,360,368 B1 | 3/2002 | Chawla | |
| 6,366,731 B1 | 4/2002 | Na et al. | |
| 6,415,031 B1 * | 7/2002 | Colligan et al. | 380/200 |
| 6,463,155 B1 | 10/2002 | Akiyama et al. | 380/278 |
| 6,466,671 B1 * | 10/2002 | Maillard et al. | 380/227 |
| 6,505,299 B1 | 1/2003 | Zeng et al. | |
| 6,507,907 B1 * | 1/2003 | Takahashi et al. | 713/150 |
| 6,526,580 B2 | 2/2003 | Shimomura et al. | |
| 6,542,610 B2 * | 4/2003 | Traw et al. | 380/262 |
| 6,560,707 B2 * | 5/2003 | Curtis et al. | 713/163 |
| 6,578,070 B1 | 6/2003 | Weaver et al. | |
| 6,598,231 B1 | 7/2003 | Basawapatna et al. | |
| 6,603,488 B2 | 8/2003 | Humpleman | |
| 6,611,503 B1 | 8/2003 | Fitzgerald et al. | |
| 6,678,733 B1 * | 1/2004 | Brown et al. | 709/229 |
| 6,681,326 B2 * | 1/2004 | Son et al. | 713/150 |
| 6,690,795 B1 | 2/2004 | Richards | |
| 6,714,650 B1 * | 3/2004 | Maillard et al. | 380/231 |
| 6,732,179 B1 * | 5/2004 | Brown et al. | 709/229 |
| 6,751,352 B1 | 6/2004 | Baharav et al. | 382/183 |
| 6,772,434 B1 | 8/2004 | Godwin | |
| 2003/0035543 A1 | 2/2003 | Gillon et al. | 380/270 |
| 2003/0081776 A1 * | 5/2003 | Candelore | 380/200 |
| 2005/0182948 A1 * | 8/2005 | Ducharme | 713/189 |
| 2005/0198680 A1 * | 9/2005 | Baran et al. | 725/88 |
| 2006/0165232 A1 * | 7/2006 | Burazerovic et al. | 380/37 |
| 2007/0204314 A1 * | 8/2007 | Hasek et al. | 725/100 |

FOREIGN PATENT DOCUMENTS

| | | |
|---|---|---|
| EP | 0 364 229 A2 | 4/1990 |
| EP | 0 512 398 A2 | 11/1992 |
| EP | 0 666 694 A1 | 8/1995 |
| EP | 0 676 761 A1 | 10/1995 |
| EP | 0 693 727 A1 | 1/1996 |
| EP | 0 714 204 A2 | 5/1996 |
| EP | 0 749 244 A2 | 12/1996 |
| EP | 0 753 964 A1 | 1/1997 |
| EP | 0 756 393 A1 | 1/1997 |
| EP | 0 773 681 A2 | 5/1997 |
| EP | 0 903 738 A2 | 3/1999 |
| EP | 0 911 962 A1 | 4/1999 |
| EP | 0 971 358 A2 | 1/2000 |
| EP | 1 018 835 A2 | 7/2000 |
| EP | 1 032 195 A2 | 8/2000 |
| EP | 1 056 279 A1 | 11/2000 |
| EP | 01 079 581 A2 | 2/2001 |
| EP | 1 143 722 A1 | 10/2001 |
| GB | 2 333 017 A | 7/1999 |
| WO | WO 99/33265 | 7/1991 |
| WO | WO 96/08912 | 3/1996 |
| WO | WO 99/22513 A2 | 5/1999 |
| WO | WO 00/01149 A1 | 1/2000 |
| WO | WO 00/51129 | 8/2000 |
| WO | WO 01/04893 | 1/2001 |
| WO | WO 01/04893 A1 | 1/2001 |
| WO | WO 01/11865 A1 | 2/2001 |
| WO | WO 01/37546 | 5/2001 |
| WO | WO 01/37546 A2 | 5/2001 |
| WO | WO 0137562 A1 * | 5/2001 |
| WO | WO 01/74079 A1 | 10/2001 |
| WO | WO 2006114760 A2 * | 11/2006 |

OTHER PUBLICATIONS

Barr, David, Copy Protection for High-Definition Baseband Video, 2000, Information Technology: Coding and Computing, pp. 174-177.*

Wirbel, Loring, Passage seen to set-tops, 2003, Electronic Engineering Times, p. 35.*

PCT Search Report dated Aug. 21, 2002 (4) pages.

U.S. Appl. No. 09/930,784, filed Aug. 15, 2001, Gillon et al.

Office Action of Aug. 10, 2005, for U.S. Appl. No. 09/930,784, filed Aug. 15, 2001.

Office Action of Mar. 14, 2006, for U.S. Appl. No. 09/930,784, filed Aug. 15, 2001.

Office Action of Jan. 30, 2007, for U.S. Appl. No. 09/930,784, filed Aug. 15, 2001.

Office Action of Sep. 26, 2007, for U.S. Appl. No. 09/930,784, filed Aug. 15, 2001.

* cited by examiner

FIG. 7

SYSTEM AND METHOD FOR MULTIMEDIA CONTENT SIMULCAST

BACKGROUND

1. Field of the Invention

This invention relates generally to the field of multimedia systems. More particularly, the invention relates to a system and method for multimedia simulcast using different encryption and/or compression techniques.

2. Description of the Related Art

As illustrated in FIG. 1, the "headend" in a cable television network is the facility where video feeds from various content providers (e.g., HBO, NBC, FOX, . . . etc) are received via satellite dish 108 and/or television antenna 109, processed by headend equipment 100 and transmitted to cable subscribers. Headend equipment 100 for processing the video feeds typically includes one or more MPEG-2 compression modules 101; conditional access ("CA") encryption modules 103 and 105; and quadrature amplitude modulation ("QAM") modules 110.

The MPEG-2 compression modules 101 compress any incoming video streams which have not already been compressed according to the MPEG-2 video compression standard. As indicated in FIG. 1, if the video content has already been compressed by the content provider, additional MPEG-2 compression will not be required at the headend (represented by the MPEG-2 stream feeding CA module 105).

Once compressed, the video content may be encrypted by conditional access ("CA") encryption modules 103, 105 to prevent users from viewing content which they do not have the right to view (e.g., subscription-based content such as HBO or pay-per-view channels). Standard CA encryption systems are well known in the art and are currently manufactured by only a relatively small group of companies including Scientific Atlanta,™ Motorola,™ and News Data Systems.™

As indicated in FIG. 1, not all video content transmitted over cable networks is encrypted. For example, analog channels are transmitted unencrypted over most cable networks. As such, to prevent users from illegally viewing the analog channels, cable companies must physically disconnect the user's home from the cable network (e.g., using remote disconnect mechanisms such as a "trap" or a manual disconnect at the user's home by a cable technician).

The encrypted and/or unencrypted channels are then modulated and statistically multiplexed by a quadrature amplitude modulation ("QAM") module 110. As is known in the art, QAM uses phase and amplitude shaping to define a string of digital data. Cable companies generally use 64 QAM or 256 QAM modulation techniques, which transmit digital content using 6-bit or 8-bit symbols, respectively. Certain multimedia systems (primarily satellite systems) use a different modulation technique known as Differential Phase Shift Keying ("DPSK") rather than QAM to modulate the video content. Once the digital content has been QAM-modulated, it is transmitted across the cable system via one or more RF modulators 115. Note that the analog signal in FIG. 1 is fed directly into the RF modulators 115 for transmission over the cable network (i.e., it is not encrypted or QAM-modulated).

As illustrated in FIG. 1, an allocation of all available bandwidth 120 on a cable network typically includes an unencrypted analog component 121, a compressed and encrypted digital component 122 (compressed via MPEG-2 and encrypted using standard encryption as described above), and a third miscellaneous component reserved for transmitting various types of control signals and data (e.g., according to the DOCSIS cable modem standard).

As illustrated in FIG. 2, a typical multimedia receiver 120 (referred to generally as a "set-top box") for receiving cable or satellite channels includes one or more tuners 210 which lock on to the video signal 200 at a particular carrier frequency and down-convert the signal to a baseband signal. A QAM demodulator 220 then demodulates the baseband video signals; a CA decryption module 230 decrypts the digital video content contained in the video signal using a series of decryption keys provided via a secure micro unit (not shown); and an MPEG-2 decoder module 240 decompresses the content. An NTSC encoder 250 may also be used to encode the digital video content so that it may be properly displayed on a standard NTSC television 260. As indicated in FIG. 2, if the analog signal is not encrypted, it may be transmitted directly through to the television 260 following demodulation.

One problem which exists with the foregoing configuration is that cable operators are unable to change the types of encryption and/or compression used for transmitting video content without upgrading all of the multimedia receivers used by current subscribers. For example, the standard CA decryption modules 230 found in current multimedia receivers are incapable of decrypting content using a non-standard encryption algorithm. Similarly, multimedia receivers equipped with MPEG-2 decoder modules 240 are only capable of decompressing video content according to the MPEG-2 standard. As such, cable operators are unable to realize the benefits of more advanced compression algorithms (e.g., such as MPEG-4 and RealVideo™ 8), and/or alternative, open encryption techniques.

Accordingly, what is needed is a system and method which will allow cable operators to implement different compression and/or encryption techniques without upgrading multimedia receivers used by current subscribers. What is also needed is a system and method which will allow cable operators to seamlessly integrate more advanced compression and encryption techniques as those techniques are developed.

SUMMARY OF THE INVENTION

A computer-implemented method is described for processing multimedia channels comprising: encrypting a first group of multimedia channels using a first type of encryption to produce a first group of encrypted multimedia channels; encrypting the first group of multimedia channels using a second type of encryption to produce a second group of encrypted multimedia channels; concurrently transmitting the first group of encrypted multimedia channels with the second group of multimedia channels to a plurality of multimedia subscribers having multimedia receivers capable of decrypting the first group of encrypted multimedia channels and/or the second group of multimedia channels.

Also described is a method comprising: receiving a plurality of channels from content providers at a cable headend; simulcasting premium cable channels to a plurality of subscribers in both a first encrypted format and a second encrypted format; and transmitting non-premium channels to the plurality of subscribers in a non-encrypted format.

BRIEF DESCRIPTION OF THE DRAWINGS

A better understanding of the present invention can be obtained from the following detailed description in conjunction with the following drawings, in which:

FIG. 7 illustrates an embodiment in which a user may watch any program currently being broadcast from the beginning.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Figure 1:
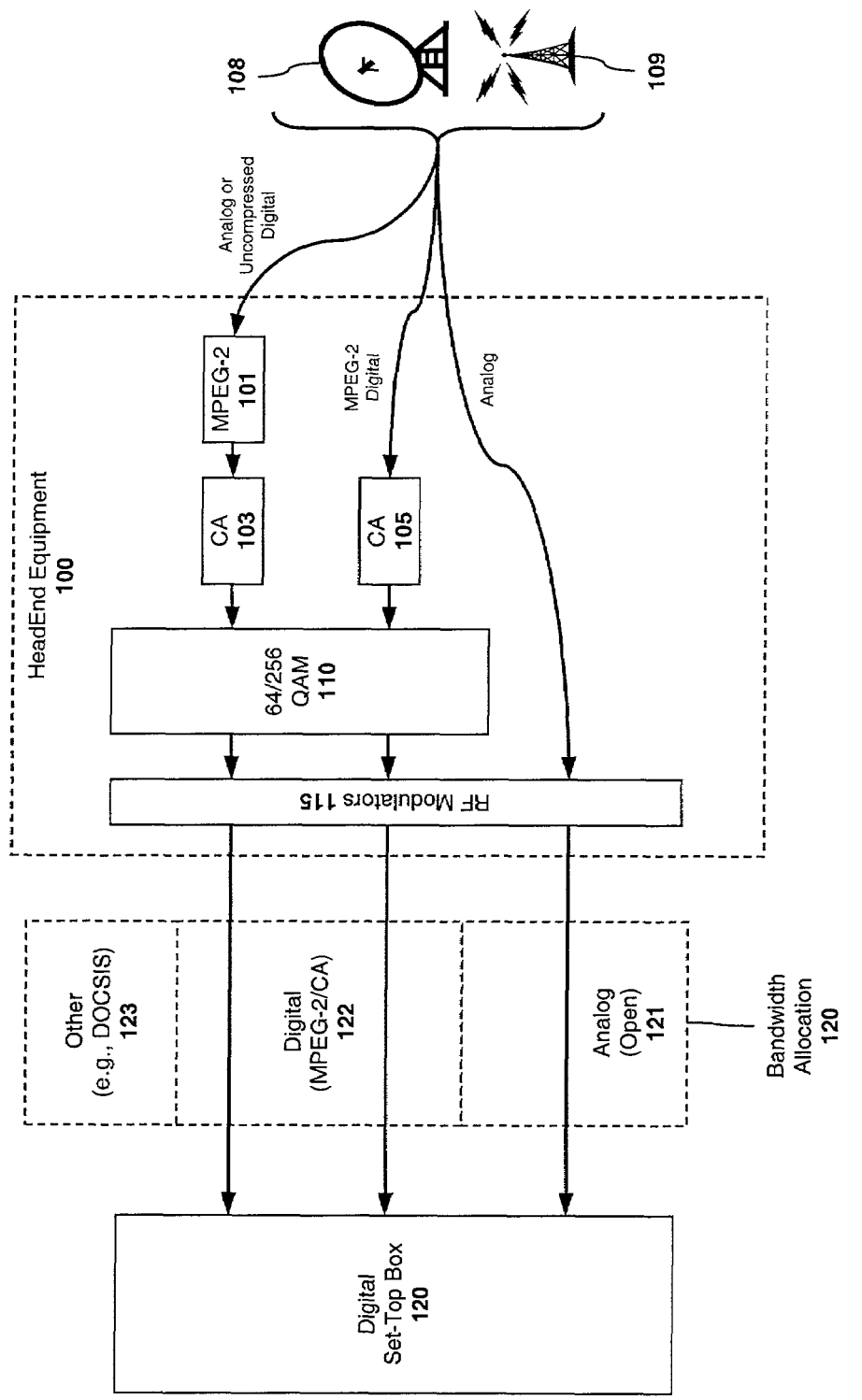
FIG. 1 illustrates a prior art headend system for receiving and processing video content.
Figure 2:
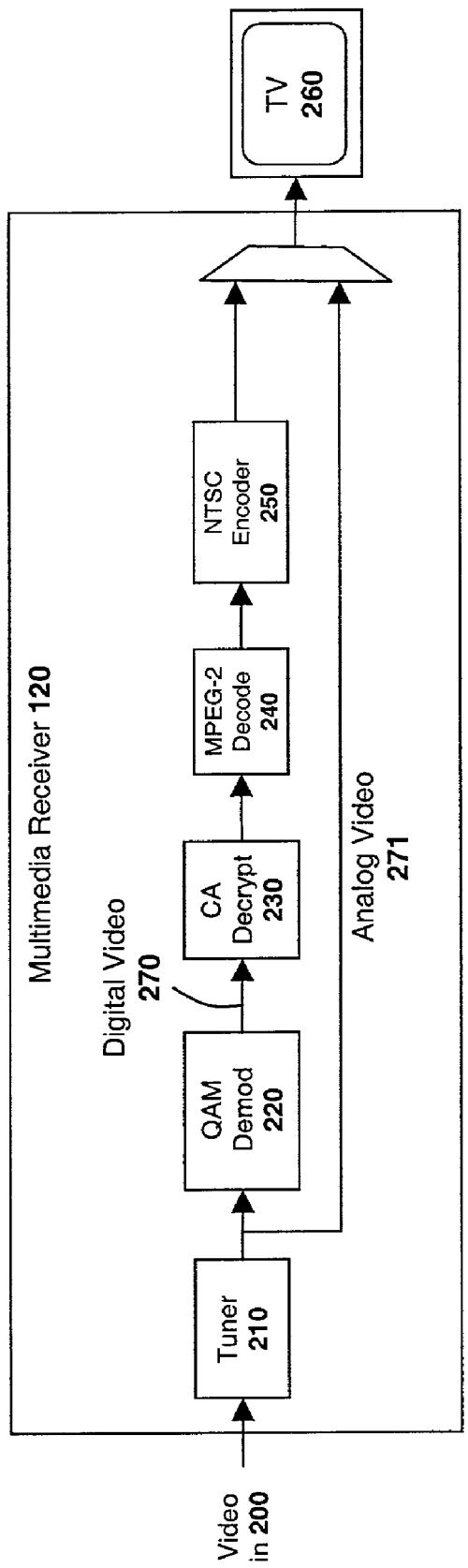
FIG. 2 illustrates a prior art multimedia receiver apparatus for receiving, decrypting and decoding cable/satellite channels.
Figure 3:
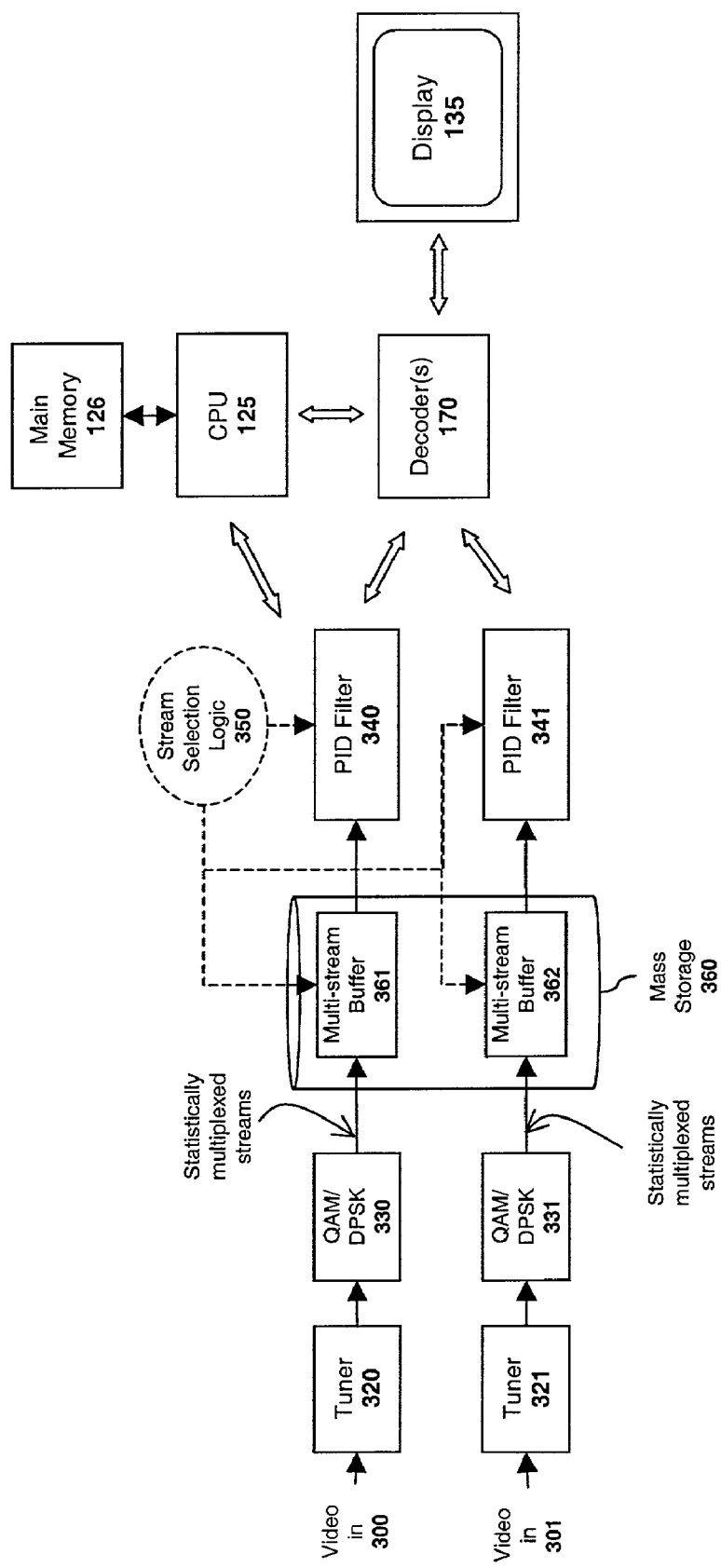
FIG. 3 illustrates one embodiment of a system for storing and processing multiple broadcast multimedia streams.

Embodiments of a System and Method for Processing Multiple Broadcast Multimedia Streams As illustrated in FIG. 3, one embodiment of the invention includes one or more tuners 320, 321 for receiving numerous statistically multiplexed streams within a specified frequency range and corresponding QAM and/or DPSK modules 330, 331 for demodulating the multiplexed streams. Unlike prior art systems, however, the system illustrated in FIG. 3 transfers all of the statistically multiplexed multimedia content (or a subset thereof) directly to multi-stream buffers 361, 362 on the mass storage device 360. The buffers may be configured to store a specified duration of content (e.g., two hours) and/or a specified amount of content (e.g., 80 Gbytes). When a user selects a particular cable or satellite channel, the PID filter modules 340 and 341 (also referred to herein as a "PID depacketizer") extract the multimedia packets for that channel (i.e., identified by the channel's PID codes) and reconstruct the underlying audio/video content by combining the packets in the proper order (i.e., the PID filter modules demultiplex and/or depacketize the content). One or more decoder modules 170 then decode the multimedia content using the appropriate decode/decompression algorithm (e.g., MPEG-2, MPEG-4, RealVideo® 8, Windows Media Technologies ("WMT"), . . . etc) and transmit the decoded multimedia content to a display 135 (e.g., a computer monitor or a television).

As mentioned above, if MPEG-2 is used as the compression algorithm, one set of multiplexed streams may have a combined bitrate approaching 40 Mbits/sec (or 16 Gbytes/hr); two sets, a combined bitrate of 80 Mbits/sec (or 32 Gbytes/hr) as indicated in FIG. 3. Accordingly, the mass storage device 360 of this embodiment is equipped with sufficient storage capacity and read-write bandwidth to store and process the multiplexed signal(s). More specifically, the mass storage device 360 in one embodiment is coupled to the system via an Ultra DMA-66/Ultra ATA-66 or faster interface (capable of supporting a throughput of at least 528 Mbits/sec), and has a storage capacity of 80 Mbytes or greater. It should be noted, however, that the particular interface type/speed and drive storage capacity is not pertinent to the underlying principles of the invention. For example, various different interfaces such as Small Computer System Interface ("SCSI") may be used instead of the Ultra-ATA/Ultra DMA interface mentioned above, and various different drive capacities may be employed for storing the incoming digital content.

Figure 6:
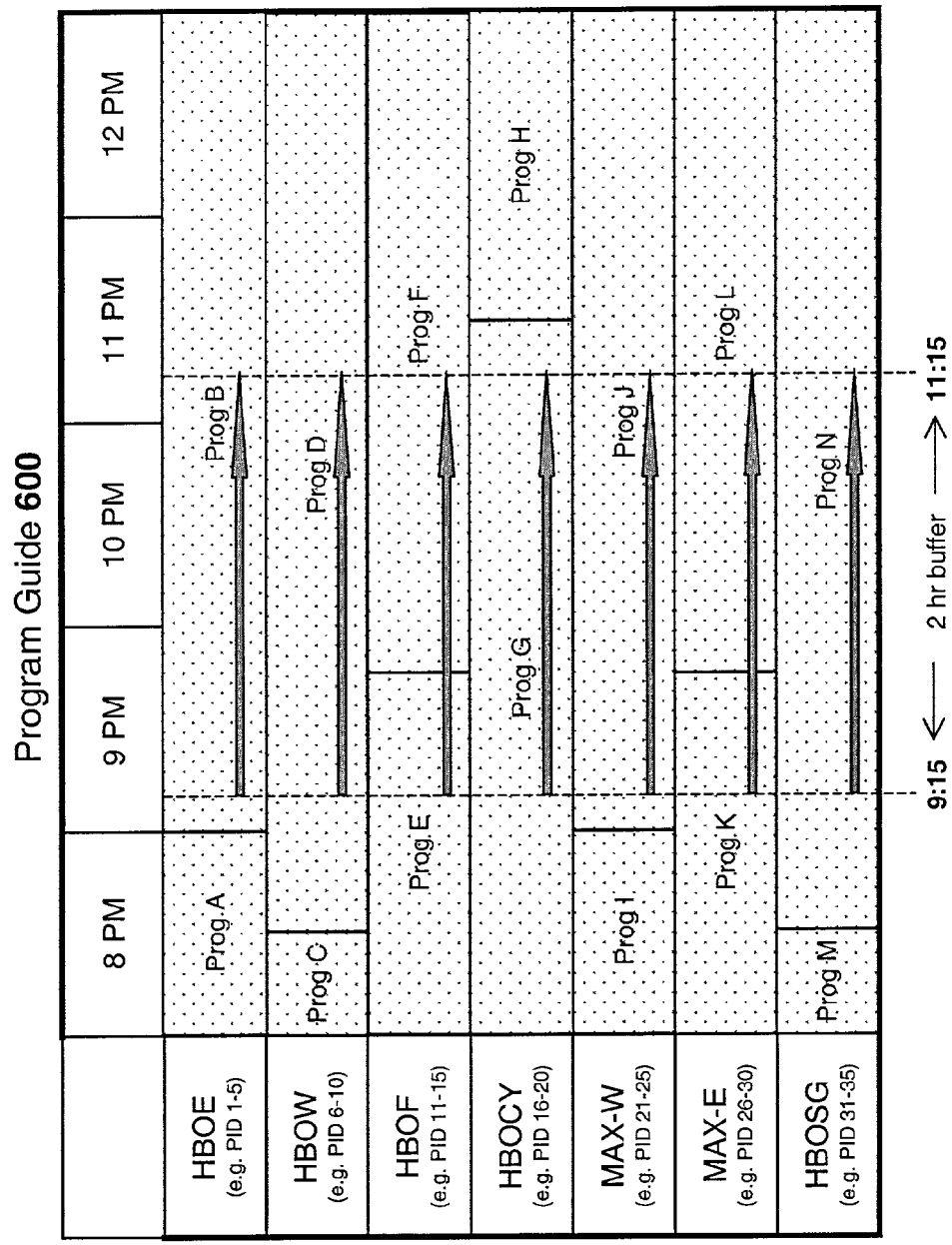
FIG. 6 illustrates operation of one embodiment which employs a buffer of a specified duration.

Storing content from multiple channels/streams on the mass storage device 360 in the foregoing manner provides numerous advantages over prior systems. More specifically, one embodiment of the invention uses the content stored in the multi-stream buffers 360, 361 to provide trick modes and other short term storage functions for all channels within the statistically-multiplexed group. For example, if a two-hour multi-stream buffer 361 is established, as indicated in the program guide 600 shown in FIG. 6, a user may pause any channel for up to two hours or rewind any channel back two hours (e.g., at 11:15 PM the user can rewind any channel back to 9:15 PM). Accordingly, if the user watching Program B on HBO East (PIDs 1-5 in the example) at 11:15, and decides to watch Program F from the beginning on the HBO Family channel (PIDs 11-15 in the example), and indicates so by choosing Program F via a remote control device or cursor control device, selection logic 350 will direct the PID filter module 340 to extract Program F from the multi-stream buffer 361. In this manner, the user will be able to view Program F in its entirety even though the broadcast of Program F started approximately 1½ hours earlier. Similarly, users may select programs on any of the other channels (e.g., Program L on Cinemax® East) broadcast up to two hours earlier. It should be noted that a two-hour buffer is described above merely for the purpose of illustration. Various alternate buffer sizes may be employed while still complying with the underlying principles of the invention.

Figure 4:
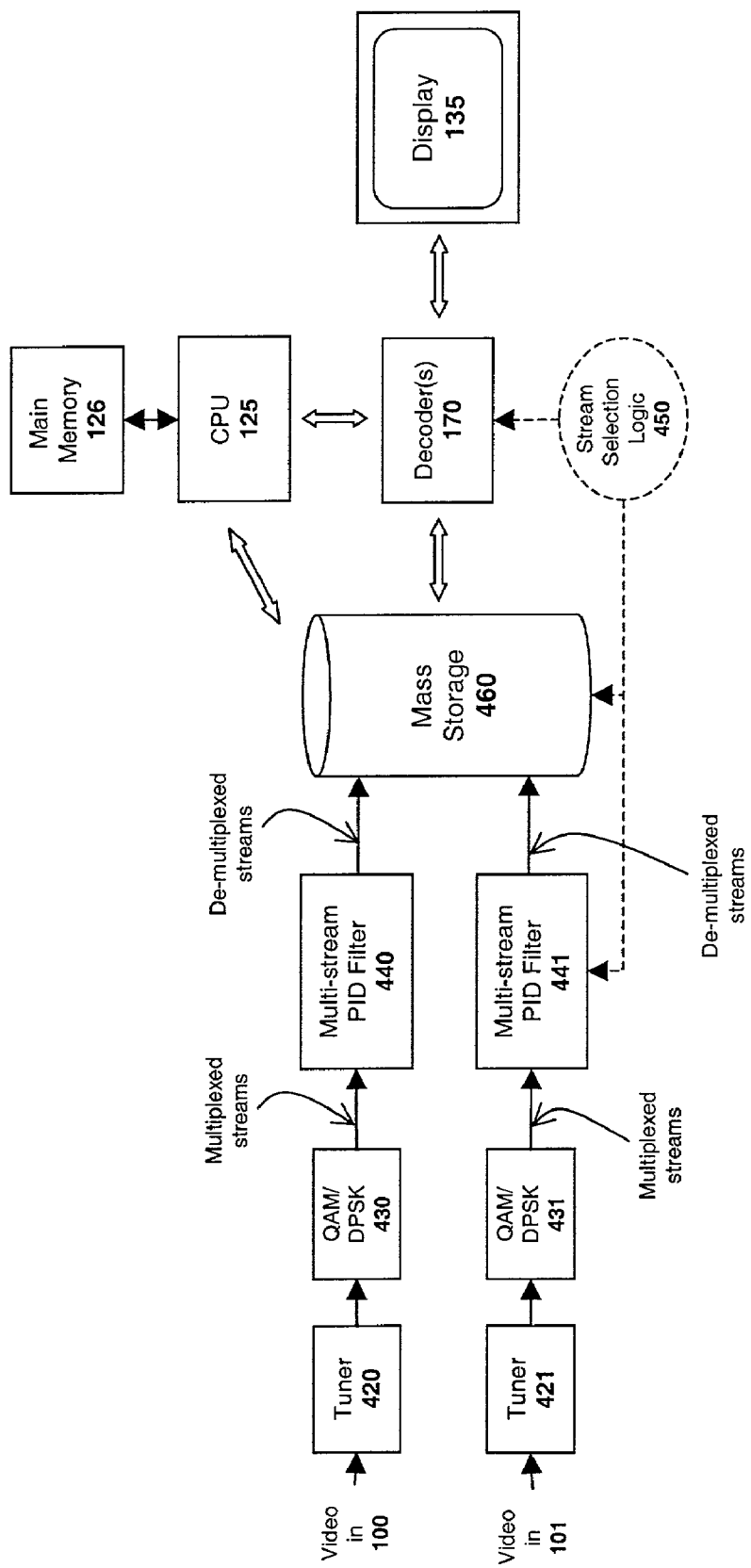
FIG. 4 illustrates an embodiment of a system for storing and processing multiple broadcast multimedia streams wherein the streams are demultiplexed before being stored.

One embodiment of the invention demultiplexes the incoming multimedia streams before storing them to a multi-stream buffer on the mass storage device 460. As illustrated in FIG. 4, this embodiment includes one or more multi-stream PID filter modules 440, 441 which extract the multimedia streams from the multiplexed signal and store them on the mass storage device 460 separated from one another. Thus, as illustrated in greater detail in FIG. 5, if the input to PID filter module 441 is a set of 'n' multiplexed streams, then the output will be 'n' independent, demultiplexed streams stored in a demultiplexed multi-stream buffer 502. Storage buffers 445, 446 may be used by each of the multi-stream PID filters 440, 441, respectively, to construct a portion of each stream (e.g., several Kbytes) before storing the portion to the mass storage device 460. This will avoid excessive seeking of the mass storage device 460 (e.g., which would result if the storage device 460 were configured to write a small amount of data such as a single PID packet for each stream at a time).

Selection logic 550, responsive to a user request to view a particular program (e.g., via remote control and/or cursor control device), will direct the decoder module 171 to read and decode one of the streams (i.e., the streams associated with PIDs 2-3 and 101-102 in the example) for rendering on a television or other display device 136. The same operations may be performed on a separate group of 'm' multiplexed streams extracted by multi-stream PID filter module 440.

Figure 5:
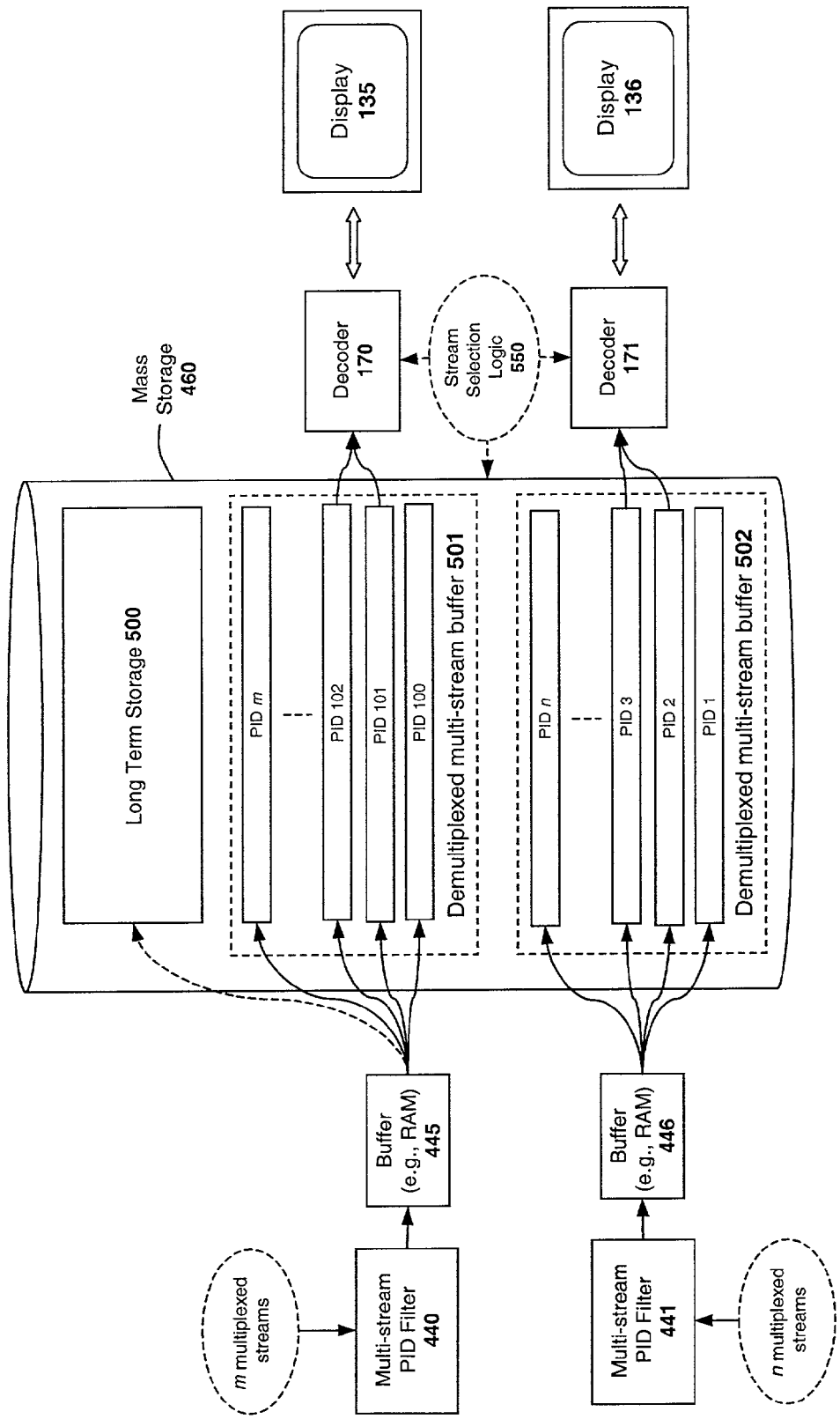
FIG. 5 illustrates more detail of an embodiment of a system for storing and processing multiple broadcast multimedia streams wherein the streams are demultiplexed before being stored.

As indicated in FIG. 5, each of the embodiments described herein may also employ a long term storage buffer 500 for recording programs specified by a user (e.g., similar to the long-term recording functionality of a VCR). In one embodiment, if a user selects a program for recording while the program is already in progress, the program content already stored in one of the demultiplexed multi-stream buffers will be transferred to the long term storage buffer 500 as well as any new program content. Alternatively, or in addition, the program content may simply be reclassified as long term storage content by changing the classification of its directory entry on the storage device rather than moving the content itself.

Figure 7:
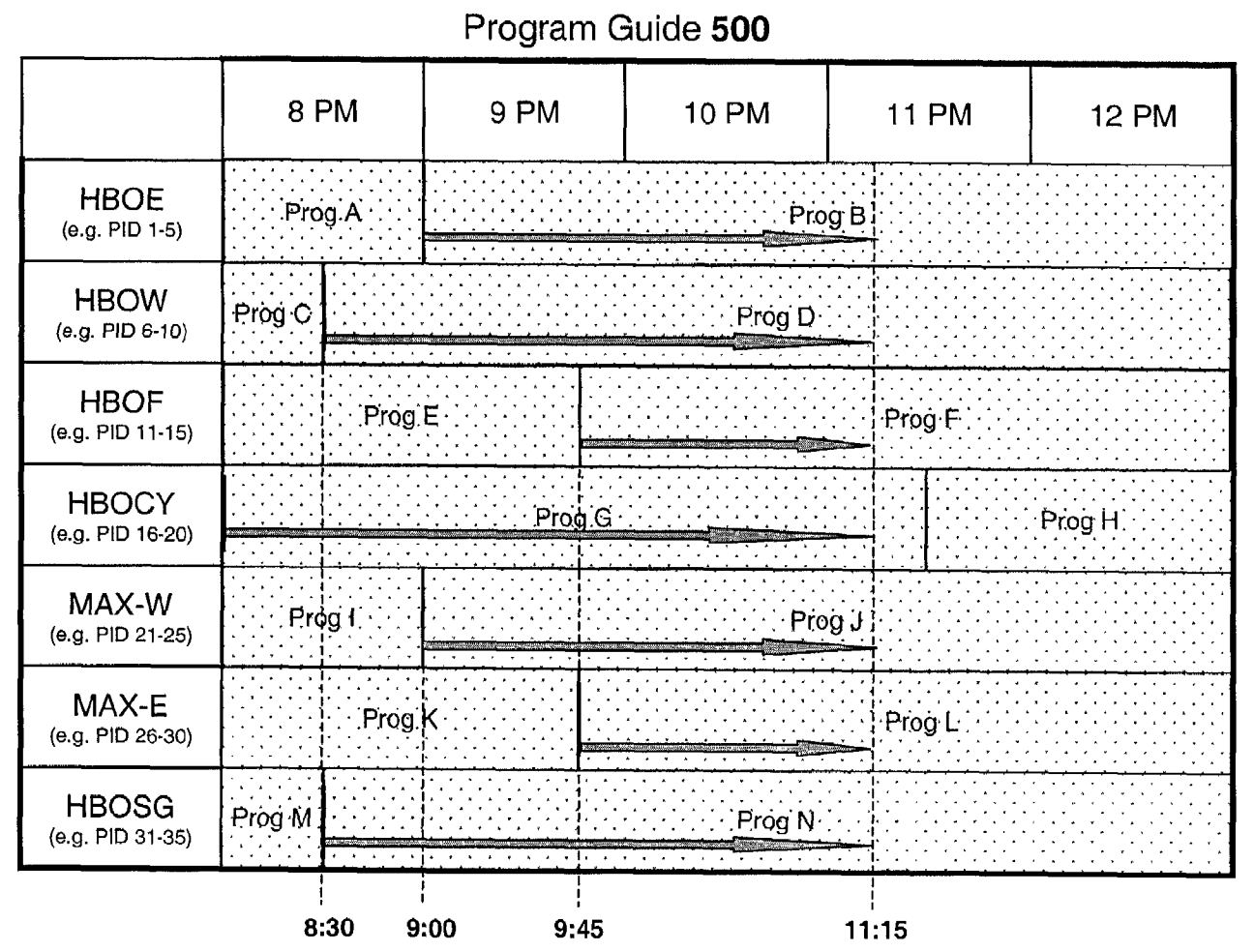

One benefit of separating the streams before storing them in the foregoing manner is that, in one embodiment, a user will be able to watch any program currently being broadcast from the beginning (i.e., the system will record back on each channel to the last complete program). Thus, as illustrated in the program guide 500 of FIG. 7, at 11:15 a user may watch program N on HBO Signature (PIDs 31-35 in the example) from the beginning even though the program started at 8:30. Similarly, the user may watch each of programs B, D, F, G, J and F from start to finish.

In one embodiment, a user may configure different buffer sizes for different channels. For example, a user who regularly watches a number of shows on HBO may decide to establish a large (e.g., 6 hour) buffer for that channel (e.g., by programming the system using a remote control, mouse or other cursor control device), whereas the same user may configure smaller buffers for channels which the user does not watch regularly (e.g., CSPAN). In one embodiment, the system will actively monitor the user's preferences and set larger buffer sizes based on which channels the user views the most frequently and/or the times/days during which the user views the channels. Various other buffer configuration schemes may be employed while still complying with the underlying principles of the invention.

It should be noted that various system functions described herein (e.g., the selection logic 350, 450, 550 used to select a particular multimedia stream; the PID filtering; the buffer settings; . . . etc) may be embodied in software executed by the CPU 125. Alternatively, or in addition, these functions may be embodied in any combination of hardware (e.g., an application-specific integrated circuit ("ASIC")), software and/or firmware while still complying with the underlying principles of the invention.

Figure 8:
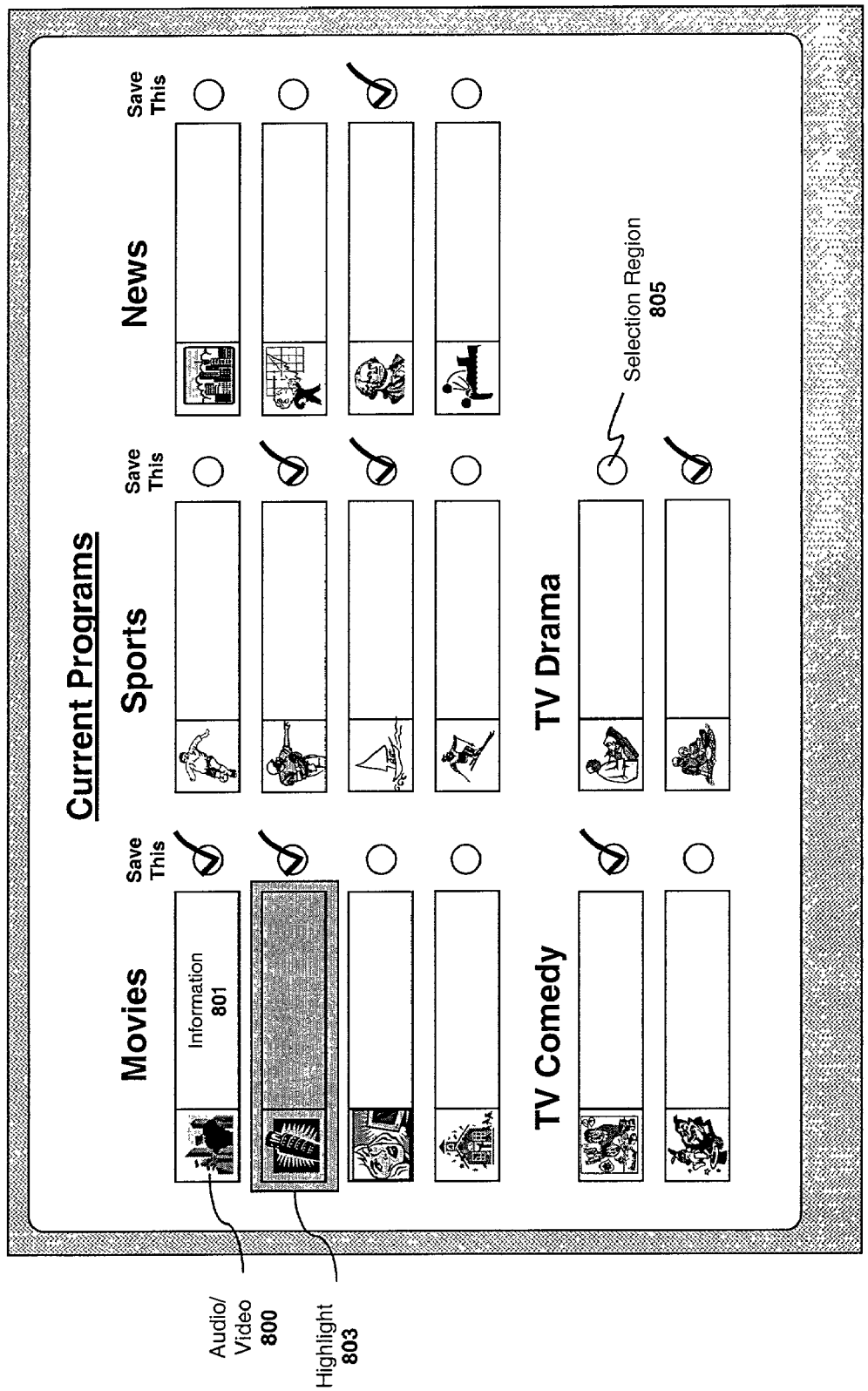
FIG. 8 illustrates a graphical user interface for selecting programs from a program guide and/or acquiring additional program-related information according to one embodiment of the invention.

Using the improved buffering techniques described above, one embodiment of the invention provides users with a listing of all currently available programs from which they may select (e.g., those programs which may be viewed in their entirety). As illustrated in FIG. 8, one embodiment of the program listing is provided in the form of an interactive graphical user interface ("GUI"). The user may select a particular program listing by moving a highlight bar 803 through the listings using a cursor control device such as a remote control, keyboard or mouse. When the highlight bar 803 is highlighting the program entry which the user wishes to view, the user may select the program entry by clicking the enter key on the keyboard/remote or the select button on a mouse.

Each program entry in the particular embodiment illustrated in FIG. 8 includes a video portion 800 and an informational portion 801. The video portion in one embodiment is a thumbnail of the actual video content provided over the cable/satellite channel. For example, if the first entry in the program list shown in FIG. 8 is HBO, then the video portion 800 of the entry will contain actual HBO video content. As a user moves through the various program entries, in one embodiment, the audio associated with that entry will also be generated. Moreover, in one embodiment, the system will display various types of user-specified broadcast content including, for example, live content (i.e., the program as it is currently being broadcast by HBO), recorded content (e.g., the first few minutes of the movie), or previews of the program (e.g., movie trailers). The underlying principles of the invention remain the same regardless of the type of content transmitted to the video portion 800 of the program entry.

Rendering audio/video content from each of the cable/satellite channels is simplified using embodiments of the present invention because the full set of multiplexed streams/channels are transmitted to the mass storage device and are accessible by the decoder modules 170, 171. Such a configuration was not possible in prior systems which only transmit one or two de-multiplexed streams to the mass storage device and decoder modules.

In one embodiment, a selection region 805 will be provided for each program entry. If a user decides that he/she would like the program entry associated with the selection region 805 to be saved, the user may simply place a check mark (or other mark) in the selection region corresponding to that entry using a remote control or other cursor control device. The system will then store the program in long term storage and/or reclassify the content as long term content as described herein. If the embodiment shown in FIG. 3 is employed, one embodiment of the invention will depacketize/demultiplex the selected program and save the program back to the mass storage device 360 (e.g., in either a packetized or a depacketized format). If the user does not wish to view the program immediately, this operation may be accomplished as a background task using the PID filters 340, 341 or other extraction software executed on the CPU 125.

The information portion 801 of the program entry may include various types of program-related data including, for example, the title and year of the movie (if the program is a movie), program reviews, and/or actors in the program, to name a few. In one embodiment, the program-related data includes links to additional information. For example, the links may be network addresses such as uniform resource locators ("URLs") which point to additional data stored on a network (e.g., the Internet). In response to a user selecting a URL (e.g., via a cursor control device), additional data addressed by the URL may be downloaded to the system and displayed to the user. Accordingly, this embodiment of the system is equipped with a modem or other device for providing two-way communication over the Internet or other network (e.g., the cable/satellite provider's network). Various types of modems may be employed including digital subscriber line ("DSL") modems, cable modems, and plain old telephone system ("POTS") dial up modems (i.e., depending on the particular type of communication channel used by the system). Of course, the type of modem used to support interactive communication is not pertinent to the underlying principles of the invention.

Wideband Implementations

Figure 9:
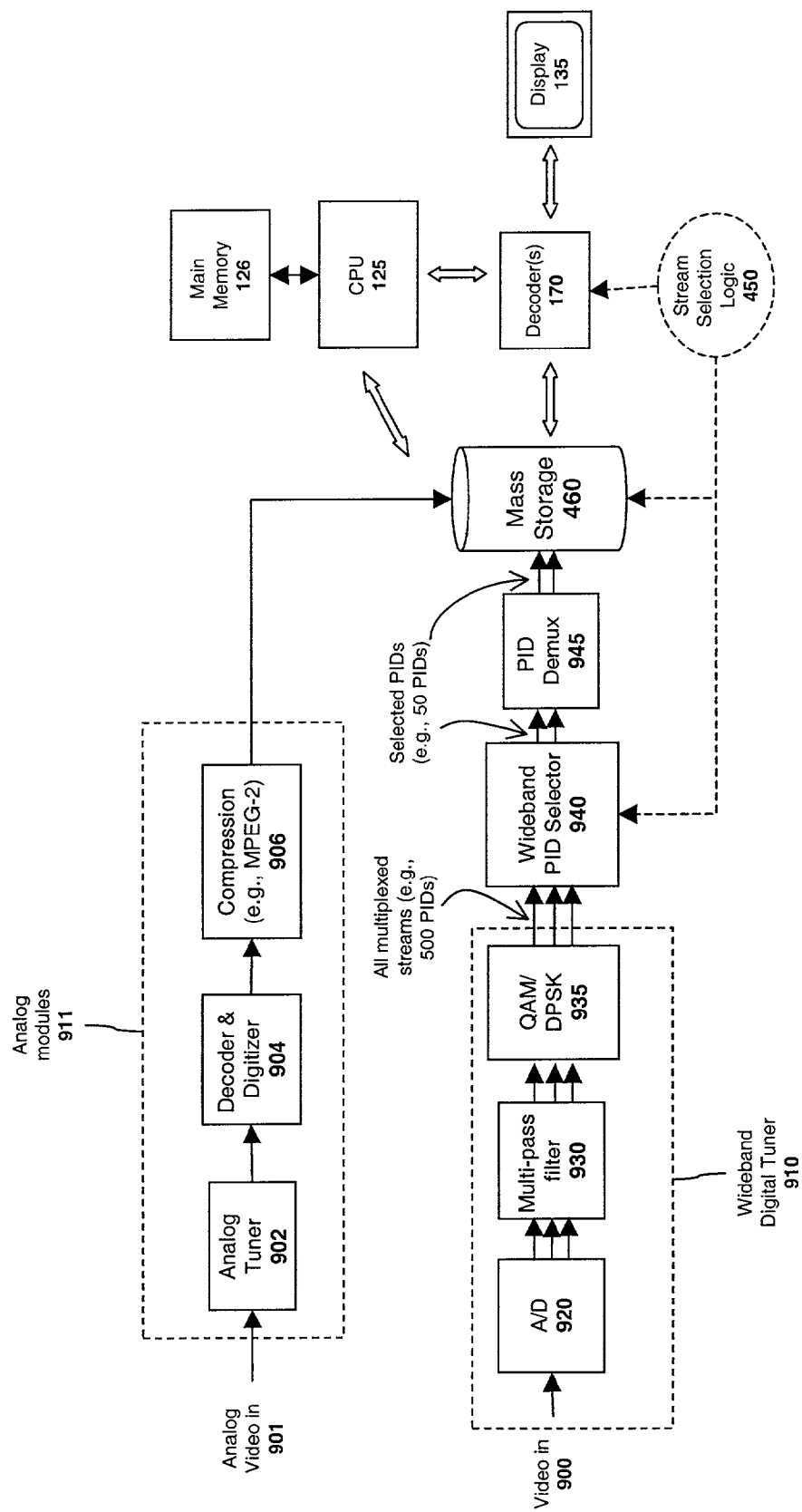
FIG. 9 illustrates a wideband implementation according to one embodiment of the invention.

In one embodiment of the invention, illustrated in FIG. 9, a wideband tuner 910 is configured in to lock on to several groups of multiplexed streams at once as opposed to just a single group. In the illustrated embodiment, the wideband tuner 910 is comprised of an analog-to-digital ("A/D") converter 920 for receiving and digitizing numerous incoming streams—potentially all streams transmitted by a particular cable/satellite provider (e.g., over a 1 GHz frequency range); a multi-pass filter 930 which divides the digitized wideband signal into a plurality of discrete frequency bands (e.g., bands of 100 MHz); and a wideband QAM/DPSK module 935 which individually demodulates the content from each of the discrete frequency bands to reproduce all of the multiplexed multimedia streams. In one embodiment, the QAM/DPSK module 935 is comprised of a series of digital signal processors ("DSPs") (e.g., one DSP per frequency band), each programmed with a QAM function for performing QAM demodulation and/or a DPSK function for performing DSPK demodulation. In addition, the DSPs may perform other functions such as signal equalization and noise filtering. In one embodiment, the DSPs operate under the control of the system's CPU 125 (e.g., the CPD executes software comprising the QAM/DPSK functions).

All of the groups of multiplexed streams (which, as indicated in FIG. 9, may include 500 or more PIDs), are transmitted through a wideband PID selector 940 which, in response to selection logic 450, selects a subset of all the multiplexed PIDs for storage on the mass storage device 460. The particular number of PIDs selected by the PID selector 940 may vary depending on the preferences of the user and/or the capabilities of the mass storage device 460 (e.g., the device's bandwidth and storage capacity). For example, in one embodiment, users may be prompted to select a set of "favorite" channels to be continually buffered on the mass storage device 460 (whereas the user's non-"favorite" channels will not be buffered, or will only be buffered for a limited time period). To support the increased storage and bandwidth requirements of the several sets of additional streams, one embodiment of the invention includes one or more additional mass storage devices (e.g., connected through a multi-drive high speed communication interface such as UDMA or SCSI).

In one embodiment, a PID demultiplexer 945 demultiplexes/depacketizes the streams selected by the wideband PID selector before storing them on the mass storage device 460. Alternatively, or in addition, the streams may initially be stored in a multiplexed format on the mass storage device and the PID depacketizer 945 may extract PID packets only when a user decides to watch/record a particular program (e.g., as described above with respect to the embodiment shown in FIG. 3). Once selected by a user, the stream is then transmitted through a decoder module 170 for MPEG-2 decoding (or other type of decoding, depending on how the stream was initially encoded) and to a display 135. Although illustrated above as two separate modules, it will be appreciated that the functionality of the PID demultiplexer 945 and wideband PID selector 940 may be combined within a single module.

In one embodiment, a separate set of analog modules 911 may be included in the system to process and store legacy analog broadcasts. The analog components may include an analog tuners 902 for receiving the analog broadcast at a particular frequency, a decoder/digitizer module 904 for decoding and performing A/D conversion on the analog signal, and a compression module 906 for compressing the signal before storing it to the mass storage device 460.

In one embodiment, the digital components may be configured to provide the analog functionality just described. For example, the DSPs within the QAM/DPSK module 935 may be programmed with an NTSC or PAL demodulation function for demodulating the incoming analog signal 901 (i.e., after the signal is digitized via the A/D converter).

Conditional Access Embodiments

In order to prevent users from viewing multimedia content which they do not have the right to view (e.g., subscription based channels, pay-per-view channels, . . . etc) the multimedia content is frequently encrypted using a series of encryption keys before being transmitted. Accordingly, multimedia systems are generally equipped with conditional access ("CA") subsystems for decrypting the incoming multimedia content.

Figure 10:
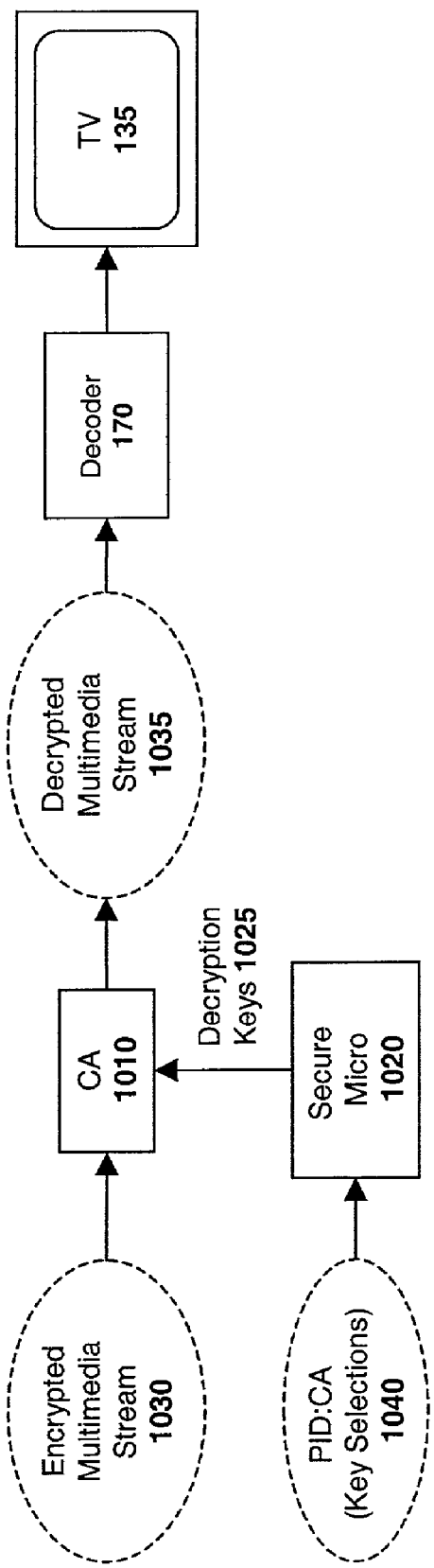
FIG. 10 illustrates operation of a conditional access module and a secure micro unit.

FIG. 10 illustrates a CA module 1010 decrypting an incoming multimedia stream 1030 to produce a decrypted multimedia stream 1035, which is then decoded by decoder 170 (e.g., using an MPEG-2 decoder) and rendered on a television display 135. The decryption keys 1025 used to decrypt the multimedia content are transmitted to the CA module 1010 from a secure micro unit 1020. Because the keys used to encrypt the multimedia stream typically change every few seconds, these key changes must be synchronized at the secure micro 1020 and CA modules 1010. Accordingly a key selection data stream 1040 (also referred to herein as the "PID:CA" stream or "conditional access data") is provided to the secure micro unit 1020 so that it knows precisely which key to transmit to the CA module 1010 at a given point in time.

As a result of the CA subsystem, if the incoming multimedia stream is stored in an encrypted format on a mass storage device, the decryption key changes associated with that multimedia stream must also be stored (i.e., so that when a user selects the stream, the secure micro will provide CA module with the decryption keys required to decrypt the stream). Prior systems deal with this problem simply by decrypting the multimedia stream before it is stored. However, storing decrypted content on a long term storage device in this manner leaves the copyright holder of the content exposed to unauthorized copying. In addition, because CA subsystems are typically only capable of decrypting one stream at a time, this configuration only provides for storage of only a single stream per CA module.

Figure 11:
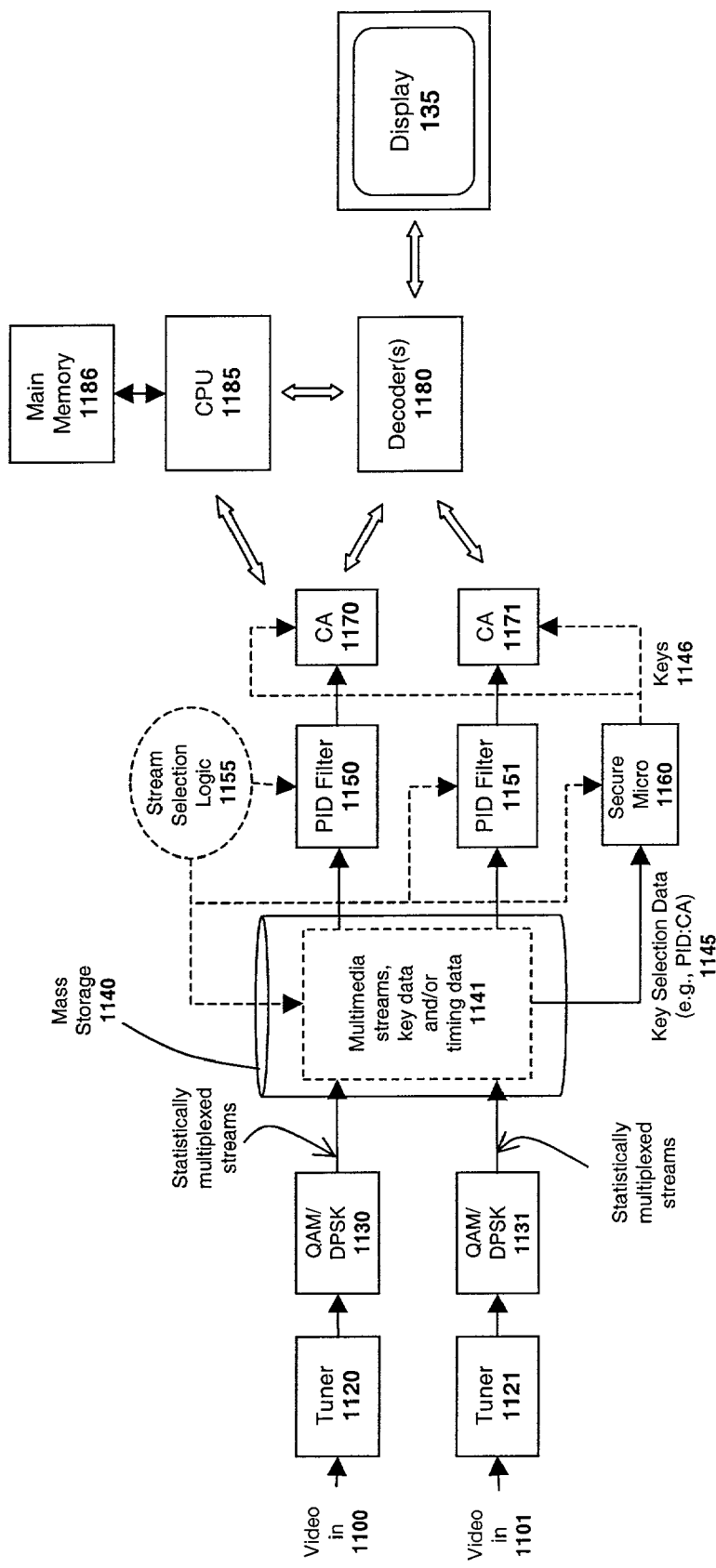
FIG. 11 illustrates a system for processing multiple multimedia streams and associated conditional access data.

One embodiment of a system for concurrently processing decryption keys for multiple streams is illustrated in FIG. 11. Like prior embodiments, this embodiment includes one or more tuners 1020, 1021 for locking on to multimedia stream within a specified carrier frequency and one or more QAM and/or DPSK demodulators 1030, 1031 for demodulating the multimedia stream.

Unlike prior systems, however, the illustrated embodiment stores the PID:CA key selection data 1145 identifying the keys 1146 to be supplied by the secure micro 1160 to the CA modules 1170, 1171 for each multimedia stream, as well as timing data indicating the points in time at which each portion of the multimedia stream and associated key selection data 1145 were received/stored on the system (or alternatively, the points in time at which the stream/content was transmitted). When a user subsequently chooses a particular multimedia stream for playback, the secure micro 1160 uses the key selection data PID:CA 1145 for that stream to provide the correct series of keys to the CA modules 1170, 1171 for decryption of the selected stream. As in the embodiments described above, the user may be able to watch any program stored on the mass storage device for a predetermined buffer period or from the beginning (e.g., as described above with respect to FIGS. 6 and 7, respectively). In one embodiment, stream selection logic 1155 (embodied in hardware or software executed by the CPU 1185) will select the correct multimedia stream and PID:CA stream at the correct point in time (e.g., using techniques described in greater detail below) responsive to the user's selection (e.g., via a remote control or a cursor control device). Once the multimedia stream is decrypted by one of the CA modules 1170, 1171, one or more decoder modules 1180 then decode the stream using an appropriate codec (e.g., MPEG-2) and transmit the decoded stream to a display 135.

Figure 12:
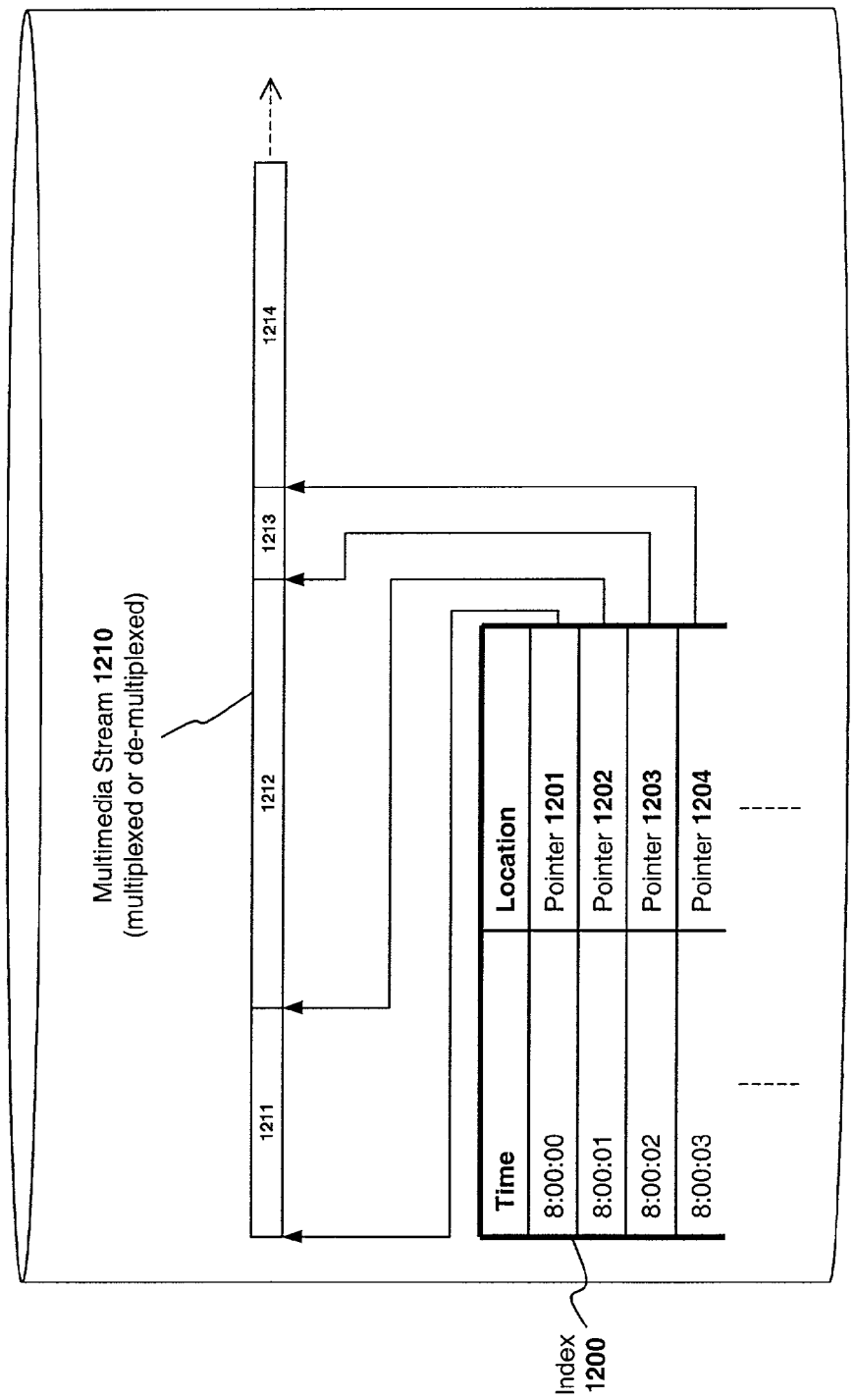
FIG. 12 illustrates a timestamp index employed in one embodiment of the invention.

Identifying the correct points in time within the multimedia stream to begin playback is complicated by the fact that MPEG-2 data (as well as other types of encoded multimedia content) is not typically received by the system at a steady rate. For example, a portion of an MPEG-2 stream which contains significant movement between each of the image frames (e.g., a video of an explosion) will typically consume significantly more bandwidth than a portion of an MPEG-2 stream that contains little or no movement. Thus, as illustrated in FIG. 12, four 1-second portions (1211, 1212, 1213, 1214) of the incoming multimedia stream 1210 may occupy different amounts of space on the mass storage device. As such, in one embodiment of the system, an index of timing data 1200 is provided so that the stream selection logic 1155 can accurately locate where on the hard drive to start decrypting/rendering the multimedia stream in response to a user request to play back a particular program. Included within the index 1200 is a series of address pointers 1201-1204, each associated with a timestamp (labeled 8:00:00 through 8:00:03). In operation, if a user selects a stored program which started at 8:00, for example, the stream selection logic 1155 will identify the 8:00:00 timestamp within the index 1200 and will start decrypting/playing the program stream back from the address identified by pointer 1201.

In one embodiment, the stream selection logic 1155 will also identify the appropriate point within the PID:CA stream from which to read the necessary key changes. In one embodiment, a separate set of pointers to the PID:CA stream may be included within the timestamp index 1200 or, alternatively, within a separate PID:CA index (not shown). Alternatively, the conditional access data PID:CA may be stored directly within the index 1200. However, in an embodiment in which the PID:CA stream is not encrypted and/or is transmitted at a steady rate (e.g., 0.1 Mbit/sec), address pointer entries to the PID:CA stream may not be required (i.e., the selection logic will be able to accurately identify where to read from the PID:CA stream without the need for an index).

In one embodiment, the timing index 1200 is transmitted along with the multiplexed multimedia streams in the form of an additional PID stream (e.g., a PID:INDEX stream transmitted from the head-end or uplink satellite that feeds the head-end). In other words, in this embodiment, the organization providing the source material (e.g., the cable or satellite provider) will generate and transmit the index to the end user's system.

However, if the content provider does not transmit the index, one embodiment of the system will construct the index 1200 as the multimedia streams are received and written to the mass storage device. For example, index/timestamp generation logic executed by the CPU 1185 (or embodied in hardware) may be configured to generate a new timestamp entry every ¹⁄₁₀₀ of a second and continuously store the results to the mass storage device 1140. However, it should be noted that the particular frequency with which timestamp entries are generated is not pertinent to the underlying principles of the invention.

Figure 13:
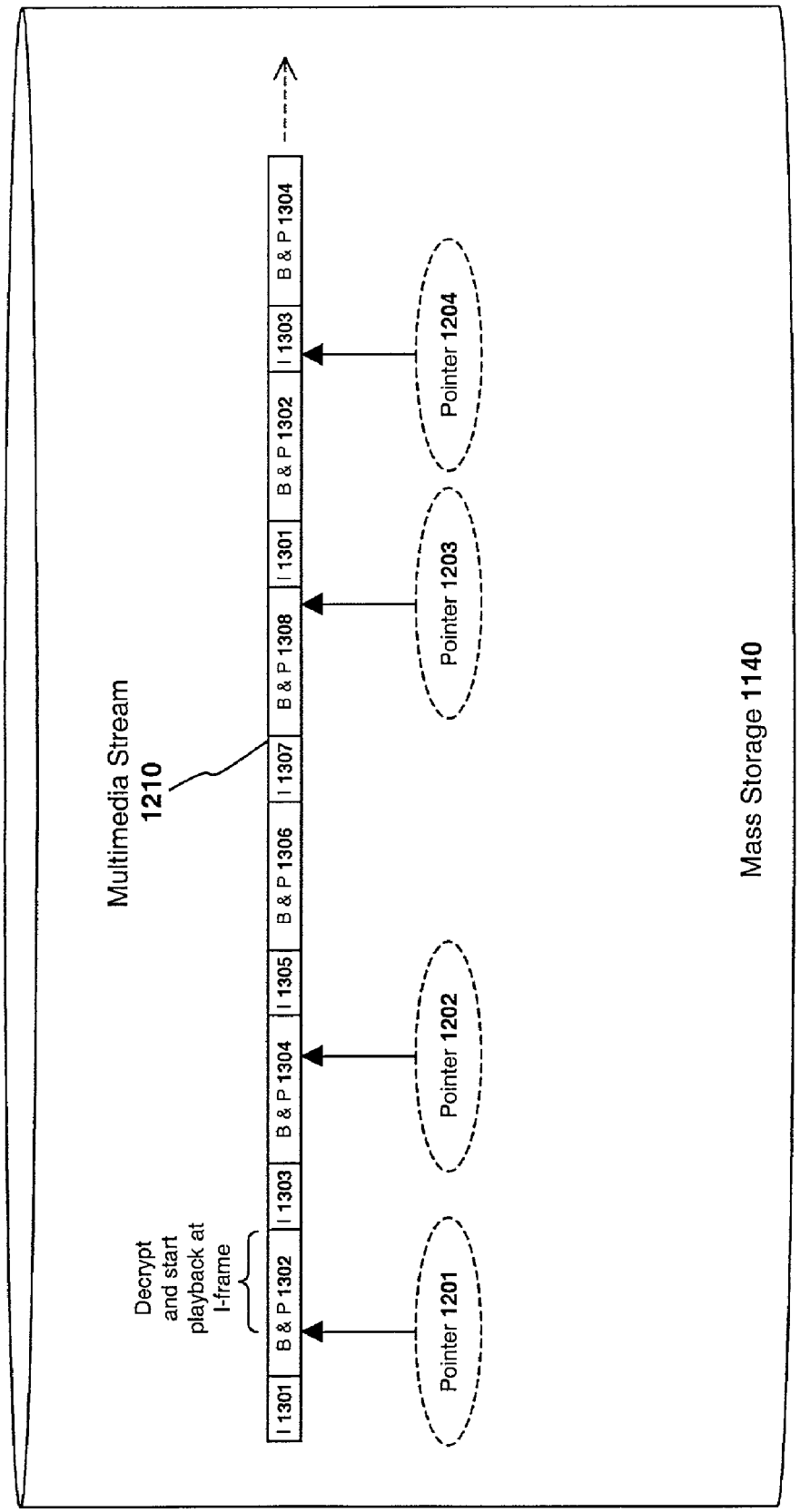
FIG. 13 illustrates techniques for identifying I-frames within a multimedia stream.

As illustrated in FIG. 13, an MPEG-2 stream 1310 is comprised of a series of I-frames separated by B-frames and P-frames. MPEG-2 uses similar DCT-based intraframe coding as the JPEG standard for each of the I-frames, but compresses the intervening video content by encoding only the differences between periodic I-frames within the B-frames and P-frames. Accordingly, it would be preferable if the pointers 1201-1204 contained in the timestamp index 1200 pointed to I-frames within the MPEG-2 stream rather than B or P frames (i.e., because the B and P frames are meaningless outside of the context of the two I-frames they connect). Accordingly, if the timestamp index is generated by the organization providing the source material, each of the pointers 1201-1204 should be selected to point to I-frames within the MPEG-2 stream.

If, however, the timestamp index 1200 is generated by the system, as described above, then the pointers 1201-1204 may not necessarily point to an I-frame. Accordingly, in one embodiment of the invention, if a stream is played back from an address pointer which does not point to an I-frame (e.g., such as pointer 1201 in FIG. 13) then it will decrypt/decode the stream up until it reaches an I-frame and will begin playback from that point. For example, in FIG. 13, the system will begin decrypting the stream at the point identified by pointer 1201 (in the middle of B & P frames 1302) but playback would not start until the decryption process reached I-frame 1303. In one embodiment, the system identifies the I-frame 1303 by decrypting its I-frame header.

Similar techniques may also be employed to allow users to fast-forward through the multimedia content. More specifically, in response to a fast forward command, one embodiment of the system will display a series of I-frames in succession. Depending on the speed at which the fast forward is set to, this embodiment may jump several I-frames at once (as described in greater detail below). If the timestamp index described above contains pointers which point directly I-frames, then the I-frames will be identified directly via the index.

Figure 14:
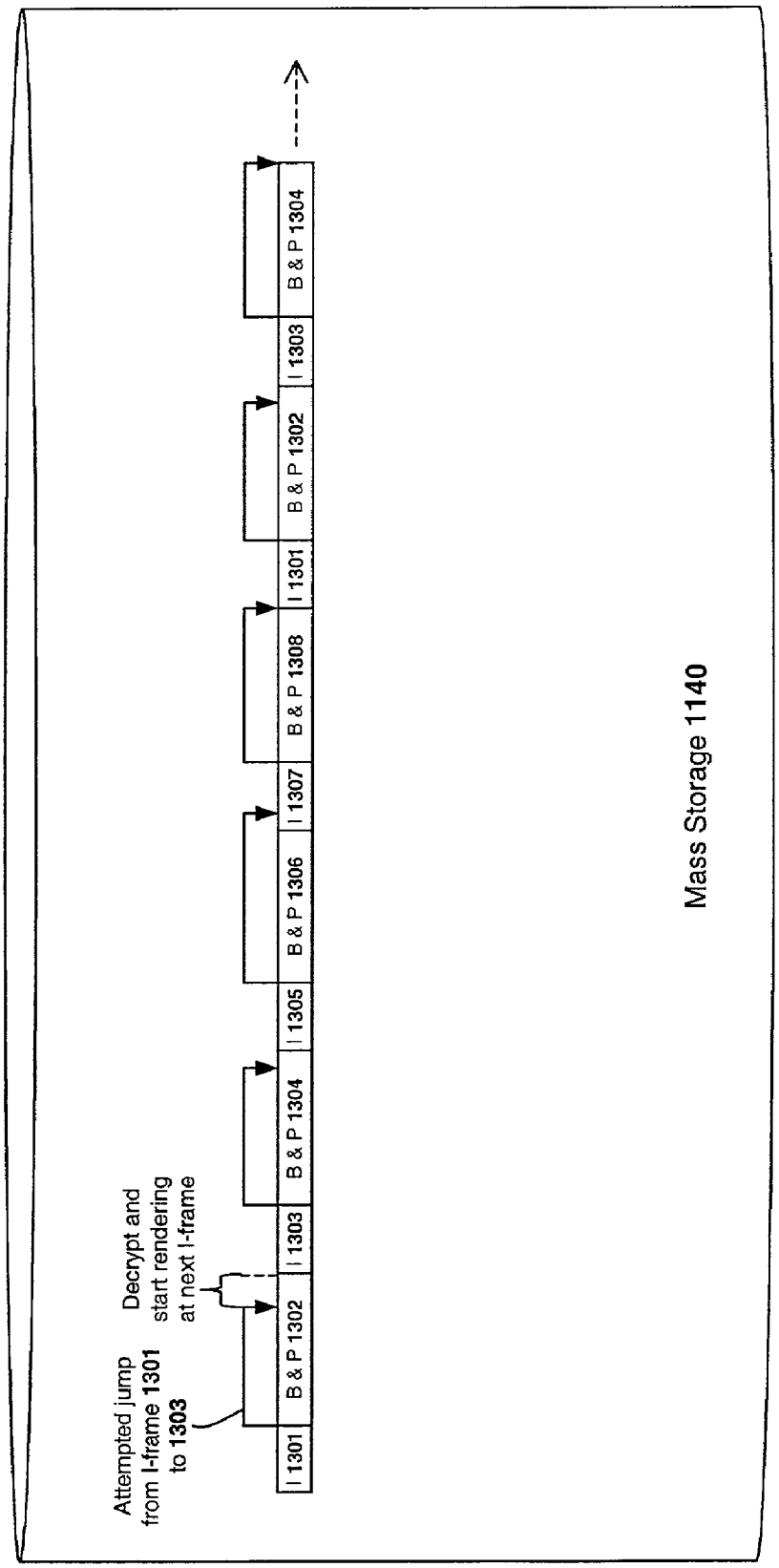
FIG. 14 illustrates operation of a fast forward function according to one embodiment of the invention.

If, however, the index is constructed as the multimedia stream is received, then jumping from one I-frame to the next may not be entirely accurate because the number of B and P frames between each I-frame and the data contained within each B and P frame is not consistent. Accordingly, as illustrated in FIG. 14, when a user selects fast forward, one embodiment of the system will estimate the jump from the current I-frame 1301 to the next I-frame 1303 based on the speed of fast forward request and/or the estimated time between each I-frame. In one embodiment, the system will perform a lookup in the timestamp index 1200 to make the jump. Alternatively, or in addition, the jump may be based on the assumption that during standard playback, a new I-frame is decided approximately every ½ second. The underlying principles of the invention remain the same regardless of how the jump to the next I-frame is estimated.

Regardless of how the jump is estimated, once it occurs, one embodiment will then begin decrypting the stream using the decryption key data PID:CA 1145 associated with that point in time, until the decryption process reaches the desired I-frame 1303. Once the I-frame 1303 is reached, it is decrypted, decoded and rendered on the display. The same techniques may then be employed for the estimated jump to the next I-frame 1305. The system may identify each of the I-frames by decrypting their respective I-frame headers.

If one embodiment, if the jump lands in the middle of the next I-frame as illustrated in FIG. 14 (as the jump from I-frame 1305 to 1307, then one embodiment of the invention will decrypt the stream backwards until it reaches the beginning of I-frame 1307. The system may identify the middle of an I-frame by the presence of I-frame data rather than B or P frame data (e.g., DCT intraframe data rather than inter-frame motion data).

If the speed of the fast forward request is set high enough the secure micro unit 1160 may be required to provide a new decryption key with each jump. Accordingly, one problem which may result is that the secure micro 1160 may not be capable of providing decryption keys to the CA module 1170 quickly enough (e.g., the secure micro may only be capable of supplying a new key every ⅓ second). If this is the case, then one embodiment of the invention will continue to display the current I-frame until a new key can be generated as it jumps over several I-frames at a time. In this manner, decryption will take place as quickly as the secure micro unit 1160 can generate new keys.

As the multimedia stream is decrypted during playback, one embodiment of the invention will store the decrypted stream back to the mass storage device 1140, thereby replacing the encrypted multimedia data. At this time an I-frame index can be written to the storage device 1140 as well. Accordingly, if a user subsequently decides to rewind to a particular point within the multimedia stream, or decides to watch the program a second time, the foregoing I-frame identification techniques may no longer be required (i.e., because the stream will have been decrypted and an I-frame index may be available). In addition, in one embodiment, as soon as the user begins watching a particular multimedia stream, the system will run ahead of stream playback, decrypting the stream as quickly as it can (generally dictated by how quickly the secure micro unit 1160 can supply keys) and storing the decrypted stream back to the mass storage device. Using this technique an entire movie may be completely decrypted during the first several minutes of playback. Accordingly, if the user subsequently chooses to fast-forward through the movie, the I-frame identification techniques described above will not be required.

In one embodiment, any multimedia programs which the user designates for long term storage (e.g., by checking the selection region 805 corresponding to the program as illustrated in FIG. 8), will be decrypted in the background by software executed on the CPU 1185 and/or using dedicated decryption hardware. This embodiment may be required in cases where the decryption keys provided by the cable/satellite provider expire after a predetermined period of time (i.e., and therefore could not be used to decrypt the multimedia programs after a predetermined time has elapsed).

In order to protect the copyright holders' rights in the multimedia content stored on the mass storage device 1140, one embodiment of the invention will employ additional encryption techniques once the multimedia content has been decrypted. For example, one embodiment of the system delivers a unique key to the mass storage device 1140 as soon as the system is powered up. This technique is available today on many current Ultra-ATA hard drives. If the wrong key is transmitted a predetermined number of times, the hard drive will render the data stored thereon inaccessible (e.g., in one embodiment the hard drive will format itself). Accordingly, an individual who steals the mass storage device 1140 will be unable to access the multimedia content.

In addition, in one embodiment, after the multimedia content is decrypted using keys supplied by the secure micro 1160, one embodiment will re-encrypt the content using one or more known encryption algorithms. For example, in one embodiment, Data Encryption Standard ("DES") encryption will be applied to the multimedia content before storing it back to the mass storage device 1141. As is known in the art, DES is a NIST-standard secret key cryptography method that uses a 56-bit key. It will be appreciated, however, that various other encryption algorithms may be employed while still complying with the underlying principles of the invention. However, one benefit of using DES encryption is that many MPEG-2 decoder chips have the DES encryption function built in (e.g., such as the AViA-9600 from C-Cube Microsystems, Inc). As such, if the system is equipped with an MPEG-2 decoder, no additional hardware will be required, thereby reducing system costs.

Figure 15:
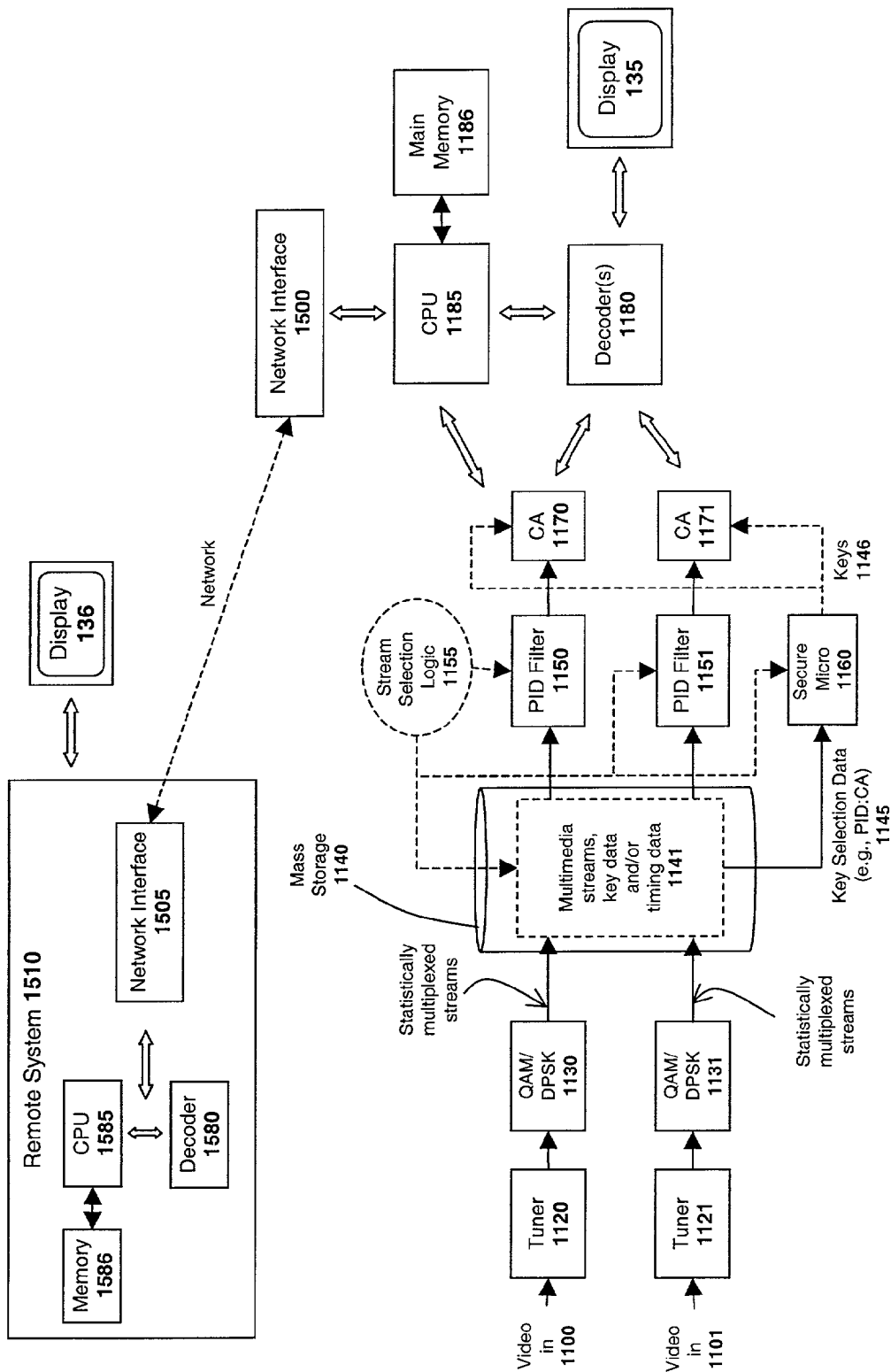
FIG. 15 illustrates an embodiment witch includes one or more remote nodes for processing multimedia content.

In one embodiment, illustrated in FIG. 15, a network interface 1500 is configured in the system to provide communication to a remote multimedia node 1510 (also equipped with a network interface 1505). Various different networking protocols/standards, both wired (e.g., Ethernet) and wireless (e.g., 802.11b), be employed to support the communication between the various nodes.

The format in which multimedia content is transmitted to the multimedia node 1510 may depend on the node's capabilities. For example, in one embodiment, the node 1510 is equipped with its own conditional access module and secure micro unit (not shown). Accordingly, in this embodiment, multimedia streams requested by the remote node 1510 may be transmitted in an encrypted format along with the associated key selection data PID:CA. By contrast, in one embodiment the remote node 1510 may not be equipped with conditional access functionality. As such, in this embodiment, the multimedia content will be decrypted before being transmitted. In order to protect unauthorized access to the multimedia content (e.g., by an unauthorized user listening on the network), one embodiment will re-encrypt the stream before transmitting it to the remote node 1510 using an encryption format which the remote node can employ in real time (e.g., DES encryption). Various other techniques may be used to provide secure communication with the remote node 1510 while still complying with the underlying principles of the invention (e.g., communication may be encrypted using Secure Sockets Layer ("SSL") encryption).

Embodiments of a System and Method for
Multimedia Content Simulcast

In one embodiment of the invention, channels are transmitted from the headend using both standard encryption/compression (i.e., standard CA encryption and MPEG-2 compression) and non-standard encryption/compression (e.g., open encryption and MPEG-4 compression). Accordingly, using this embodiment, cable operators may design new multimedia receivers which take advantage of the more advanced encryption and/or compression techniques. At the same time, older multimedia receivers will still receive channels encrypted/compressed using standard encryption/compression. As such, cable operators may seamlessly migrate to the newer multimedia receivers over time (i.e., without incurring the significant cost associated with replacing all legacy multimedia receivers at once).

Figure 16:
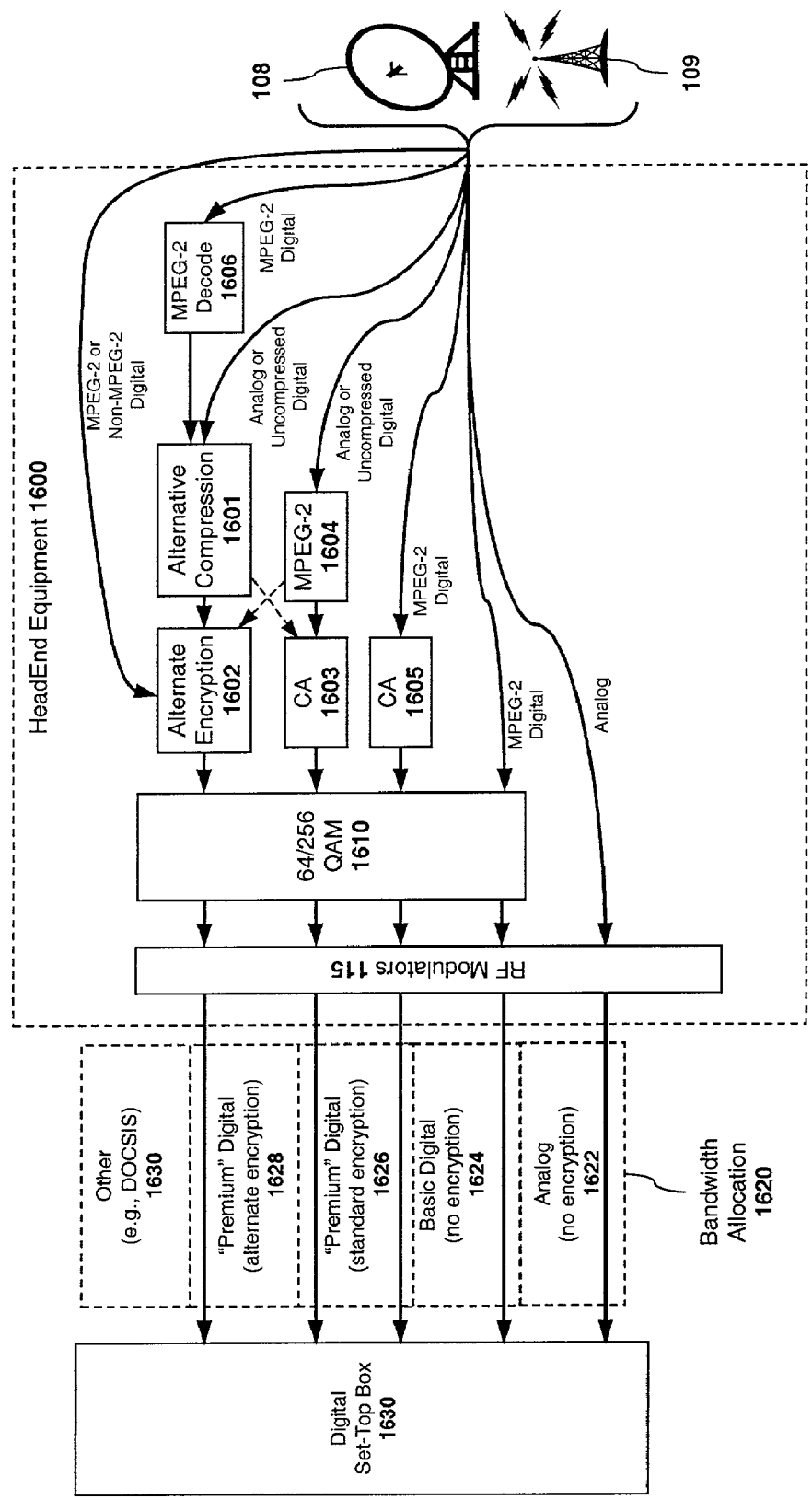
FIG. 16 illustrates one embodiment of the invention for simulcasting channels in two or more encrypted formats.

As illustrated in FIG. 16, one embodiment of a headend system 1600 for simultaneously broadcasting each digital multimedia stream ("simulcasting") is comprised of a standard MPEG-2 module 1604 and conditional access module 1603 for transmitting digital streams to legacy multimedia receivers. In addition, the system 1600 includes one or more alternative compression modules 1601 for compressing the multimedia streams using non-MPEG-2 compression algorithms (e.g., MPEG-4, RealVideo 8, . . . etc) and/or one or more alternative encryption modules 1602 for encrypting the video content using non-standard encryption formats (e.g., Digital Video Broadcast ("DVB") encryption, Secure Sockets Layer ("SSL") encryption, DES encryption or any other encryption format).

In one particular embodiment, the alternative encryption modules 1601 encrypt all portions of the multimedia streams except for the I-frame header information, thereby providing an effective mechanism for identifying each I-frame within each multimedia stream stored on the mass storage device (e.g., to be used to jump backwards and forwards in the stream once it is stored in an encrypted format). A detailed description of alternate techniques for identifying I-frames within multimedia streams (i.e., if the I-frames are encrypted) is set forth above.

The headend system 1600 may also modify the initial compression format of the video streams. For example, one or more MPEG-2 decoder modules 1606 may decompress incoming MPEG-2 video streams. Alternative compression module(s) 1601 may then re-compress the video stream using one or more of the alternate compression formats.

As indicated by the dotted line connecting MPEG-2 compression module 1604 with alternate encryption module 1602, in one embodiment of the invention, channels may be transmitted using standard MPEG-2 compression but alternate encryption. Similarly, as indicated by the line connecting alternate compression module 1601 with CA module 1603, channels may be transmitted using standard encryption but alternate compression. Moreover, as indicated in FIG. 16, video streams which are received at the headend in a compressed format may be input directly to alternate encryption module 1602 for encryption.

Transmitting each digital video channel in two (or more) independent compression/encryption formats as described above will consume a significant amount of network bandwidth. As such, in the embodiment illustrated in FIG. 16, not all channels are simulcast. Rather, as indicated by bandwidth allocation 1620, in this embodiment only the "premium" channels (e.g., subscription-based channels such as HBO, Showtime, Encore, Cinemax . . . etc) are simulcast, represented by allocation blocks 1626 and 1628. The remainder of the digital and/or analog channels (i.e., the "basic" channels provided with any cable subscription) are transmitted in the clear as indicated by bandwidth allocation blocks 1622 and 1624. Given the fact that analog channels are already transmitted unencrypted in most areas, transmitting the "basic" digital channels unencrypted will not expose cable companies to a significant amount of additional risk.

Figure 17:
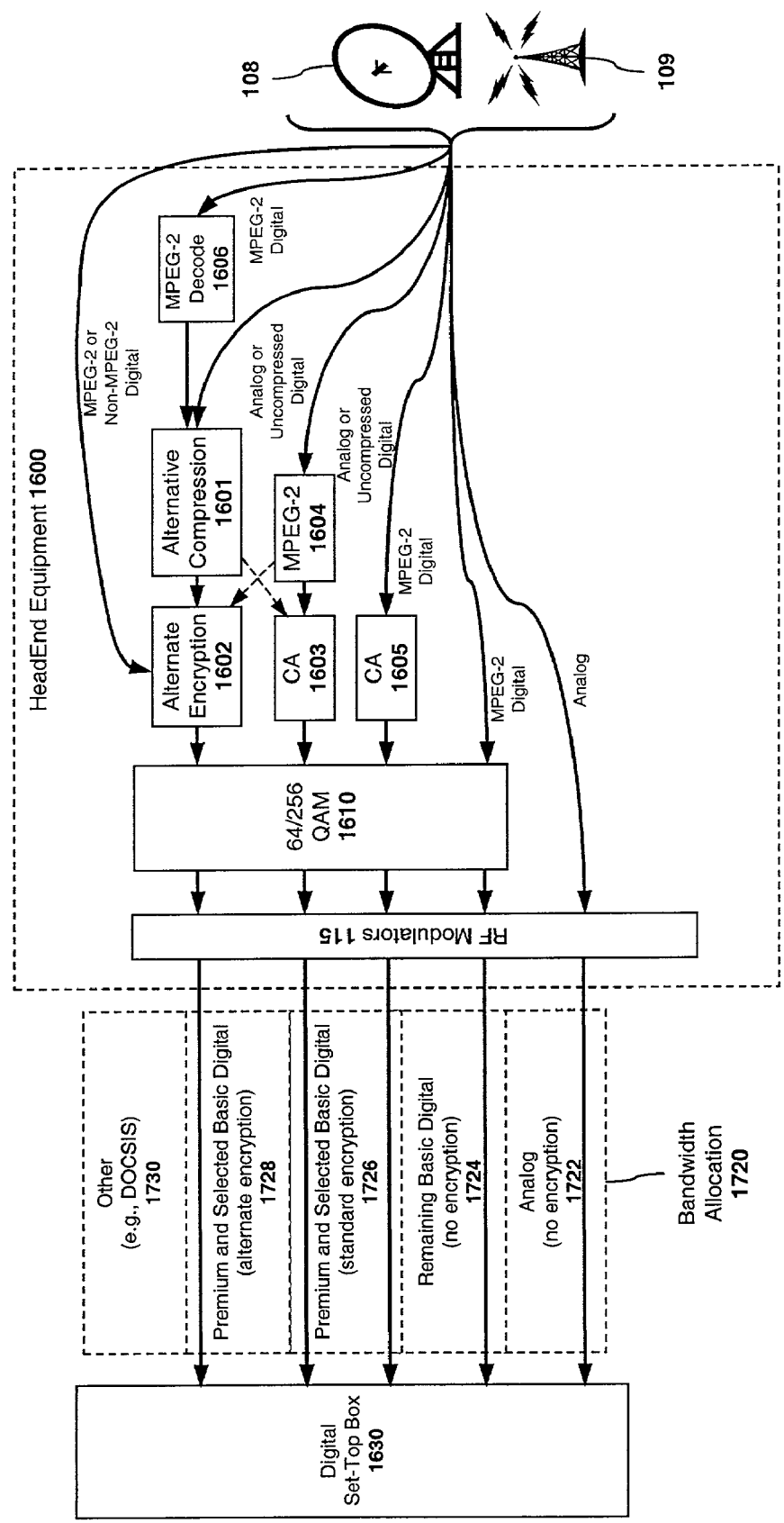
FIG. 17 illustrates another embodiment of the invention for simulcasting channels in two or more encrypted formats.

In order to further decrease the risk associated with transmitting unencrypted basic channels, in one embodiment, a subset of the basic channels are also simulcast as described above (i.e., using both standard and alternate encryption techniques). Thus, as indicated by the bandwidth allocation 1720 in FIG. 17, a selected group of basic digital channels are simulcast using both standard encryption (represented within allocation block 1726) and an alternative encryption (represented within allocation block 1728). The remaining basic digital channels are transmitted with no encryption, represented within bandwidth allocation block 1724. Accordingly, using this embodiment, individuals attempting to illegally view or "pirate" cable channels will only be able to view a subset of the basic digital service, thereby further decreasing the risk to cable companies and the content providers.

In addition, in one embodiment, the channel line-ups in the simulcast and non-simulcast groups are continually modified. For example, a channel such as ESPN may be allocated to the unencrypted group some of the time and to the encrypted simulcast group the remainder of the time. In one embodiment, the channel allocation for each group is modified on a random basis. For example, after a predetermined period of time (e.g., every minute, hour, day . . . etc) a specified number of channels may be randomly allocated to the encrypted simulcast group, with the remainder being allocated to the unencrypted group. Randomly reallocating channels between groups in this manner makes it impossible for users to anticipate how the channels will be transmitted during any given period of time, thereby further decreasing the risk of pirating (i.e., without subscribing to the cable service, users will be unsure of the channels will be available from one day to the next).

Figure 18:
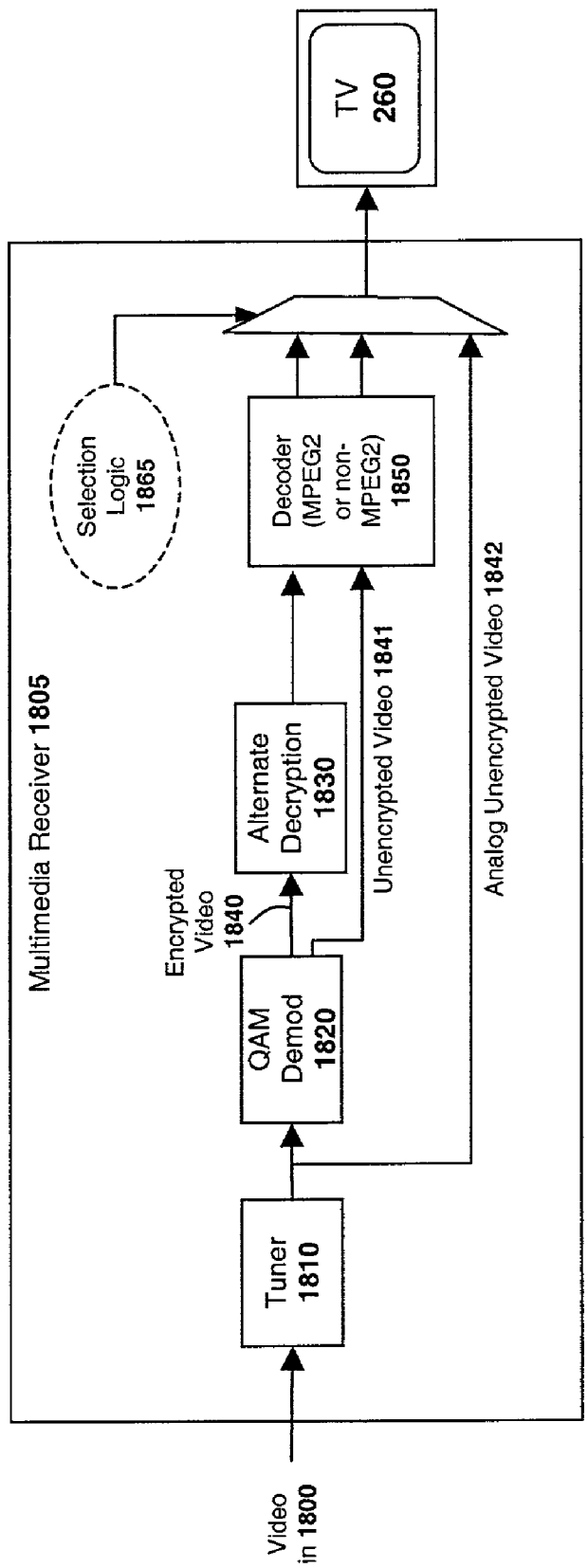
FIG. 18 illustrates one embodiment of an apparatus for receiving and processing multimedia channels.

FIG. 18 illustrates one embodiment of a multimedia receiver 1805 for receiving multimedia channels which have been transmitted using the techniques described above. As in prior embodiments, this embodiment includes a tuner 1810 for locking on to one or more channels and a QAM demodulator 1820 for demodulating the channels. Unlike standard cable systems, however, the illustrated embodiment includes a alternate decryption module 1830 for decrypting the channels which have been encrypted using non-standard encryption techniques (e.g., DVB encryption) and a decoder for decoding each of the channels using either standard decoding formats (e.g., MPEG-2) or alternate decoding formats (e.g., MPEG-4, Real Video 8 or any other compression technique employed at the headend 300 to encode/compress the channels).

The tuner 1810, QAM module 1820, alternate decryption module 1830, decoder module 1850 and various other modules described herein may be implemented by hardware, software or any combination thereof. For example, in one embodiment, the tuner 1810, QAM module 1820, alternate decryption module 1830, and/or decoder module 1850 are implemented using one or more application-specific integrated circuits ("ASICs").

Figure 19:
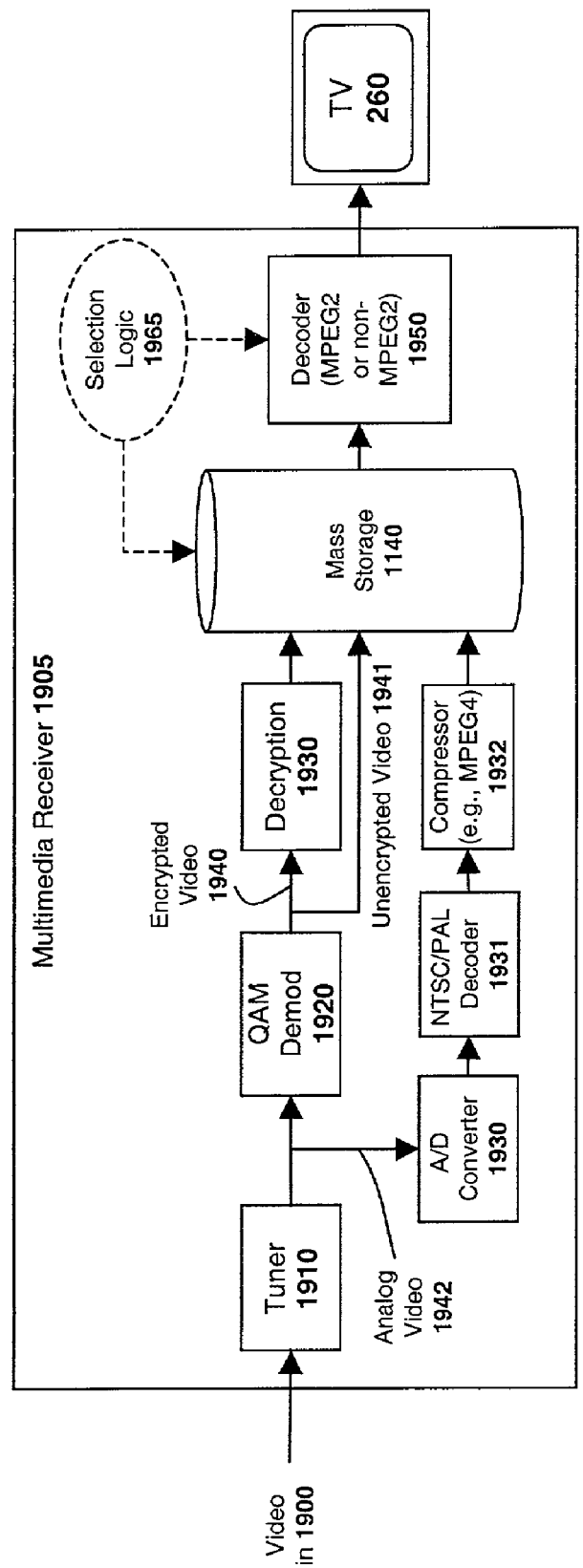
FIG. 19 illustrates an embodiment of the invention for digital signal simulcast which includes a mass storage device.
Figure 20:
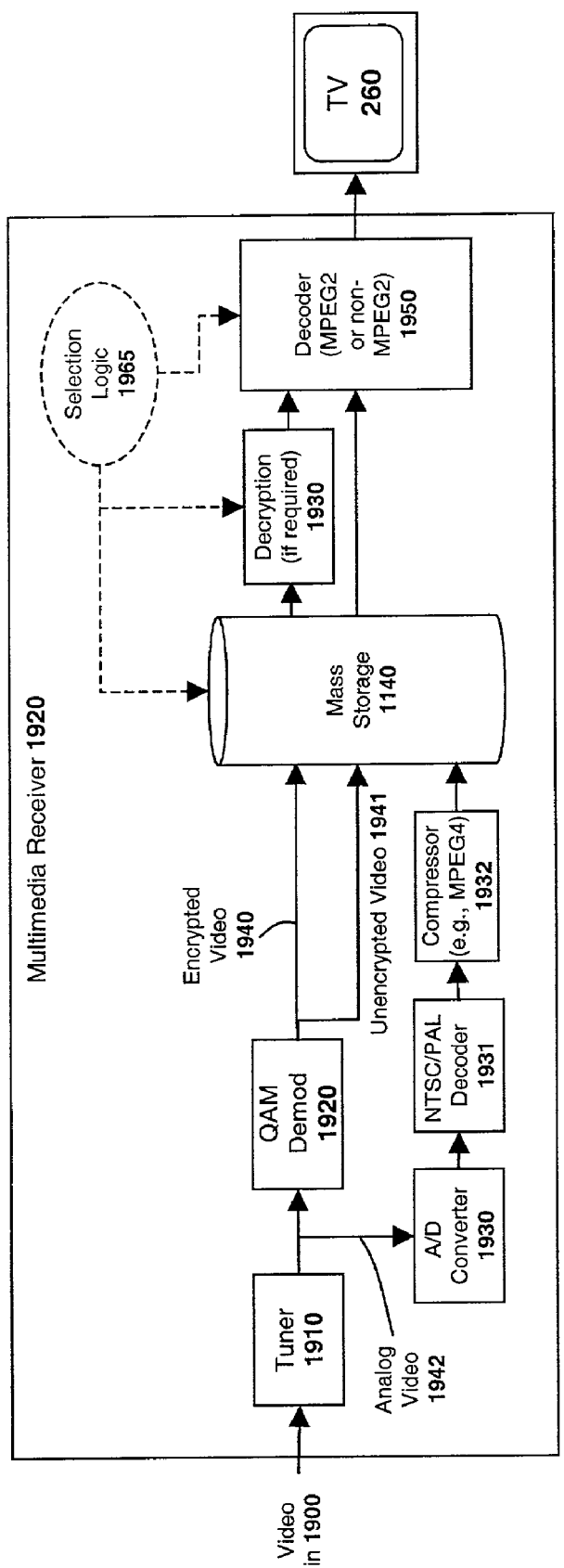
FIG. 20 illustrates another embodiment of the invention for digital signal simulcast which includes a mass storage device.

In one embodiment, illustrated in FIG. 19, the multimedia receiver 1905 is also equipped with a mass storage device 1140 for recording channels on behalf of the end user. Analog signals are initially converted to digital by an A/D converter module 1930. An NTSC/PAL decoder module 1931 then decodes the underlying signal (i.e., according to the NTSC or PAL television standards), and a digital compression module 1932 compresses the digital signal before it is stored on the mass storage device 1140 (e.g., in MPEG-2, MPEG-4 or other compression format). FIG. 20 illustrates an embodiment in which content is stored on the mass storage device 1140 in an encrypted format. The decryption module 1930 is employed to decrypt the content only after a particular program has been selected by the user.

Using the mass storage device 1140, the multimedia receivers 1905, 2005 may employ any of the techniques described above for concurrently processing and storing multiple audio/video streams (see, e.g., FIGS. 3 through 9 and associated text). For example, the GUI illustrated in FIG. 8 may be provided to allow users to select from a list of currently available programming, regardless of how the programming is transmitted to the multimedia receiver 1905. In addition, embodiments of the multimedia receivers 1905, 2005 may store and process conditional access data as described above (see, e.g., FIGS. 10 through 15 and associated text). For example, a timestamp index may be generated for those programs which are stored on the mass storage device 1140 in an encrypted format.

Various additional multimedia processing and storage techniques may be implemented in connection with the embodiments of the invention described herein. For example, the advanced compression techniques described in the co-pending application entitled "APPARATUS AND METHOD FOR INTELLIGENT MULTIMEDIA COMPRESSION AND DISTRIBUTION" (Ser. No. 09/721,556) may be employed (e.g., to modify the type of compression used for storing multimedia streams, to compress the streams in the background, . . . etc). This application is assigned to the assignee of the present application.

One benefit of transmitting multimedia channels using more advanced compression techniques such as MPEG-4 or Real Video 8 is that these techniques can achieve approximately 2 to 3 times the compression of MPEG-2 while maintaining a comparable level of video quality. As such, in one embodiment, a significantly greater number of channels may be transmitted in a single QAM signal. For example, if twelve MPEG-2 channels can be transmitted in a single 256 QAM, then 24 to 36 channels may be transmitted using the same QAM signal if more advanced compression techniques are used, resulting in a more efficient multimedia broadcast. Accordingly, multimedia receivers capable of decompressing the streams using more advanced decompression modules 1850, 1950, will provide users with a greater number of channel selections per QAM demodulator 1820, 1920, resulting in a less expensive multimedia receiver (i.e., because fewer QAM demodulators are needed) and/or an improved user experience (i.e., because a greater number of channels are available).

The standard PID packet size used by cable/satellite companies is 188 bytes. In one embodiment, when processing and storing multiple streams as described herein, packets for each stream are initially combined in memory. Once a sufficient number of PID packets have been combined in memory (e.g., 100 Kbytes), the combined chunk of data is written to the mass storage device 1140 all at once. Buffering and combining packets in this manner significantly reduces the seek time when writing the data out to disk (i.e., if the mass storage device 1140 is a hard drive). For example, if the PID packets were written to disk as soon as they were received, the disk head would spend in an inordinate amount of time jumping from one stream to the next, thereby significantly degrading system performance.

In one embodiment of the invention, the PID packet size is increased, thereby reducing the buffering requirements at the multimedia receiver. In other words, if each packet contains significantly more data than the current 188 bytes (e.g., 100 Kbytes) then the disk seeking problems described above will not be an issue. Each time the disk head seeks to write multimedia content from a particular stream, it will write for a significantly longer period of time before seeking to the next stream. Accordingly, the memory buffer may be configured to store fewer packets than the number of streams processed by the system. The new packet size may be equivalent to the combined "chunk" of data described above. In one embodiment, the new packet size is only employed for one of the simulcast digital channel groups (e.g., the one used for alternative compression/encryption techniques).

Rather than redefining the underlying PID packet size of 188 bytes, in one embodiment, standard 188-byte PID packets are combined at the headend and transmitted only after a predetermined number have accumulated for a particular stream. For example, the headend may wait to transmit data for a video stream until 500 PID packets for that stream have accumulated.

A larger packet size was not practical in prior systems because of the potential delay experienced when tuning from one stream to the next, particularly with respect to low-bandwidth streams. For example, a packet containing 100 Kbytes of data in a low bandwidth stream (e.g., an audio stream) may represent several seconds of playback. Accordingly, if a user tunes to that particular stream shortly after a packet has been received by the system, he/she may need to wait several seconds for the next packet to arrive.

Because embodiments of the present invention concurrently store and process multiple streams, however, if the user tunes to a low-bandwidth stream, playback may begin using portions of the stream buffered on the mass storage device 1140 (e.g., delayed from the live broadcast by a short amount of time, within which the next PID packet is received). In one embodiment, a minimum acceptable channel changing speed is established. If a delay greater than this minimum speed would result when tuning to a particular channel, then playback will begin from the portions of the stream stored on the mass storage device. In one embodiment, a synchronization option is provided which synchronizes the stream playback with the live broadcast, thereby allowing users to view/hear a non-delayed version of the stream (e.g., by waiting for the next PID packet to arrive before starting playback).

Various packet sizes may be employed while still complying with the underlying principles of the invention. However, in one particular embodiment, the packet size is selected based on how efficiently it may be written to the mass storage device. For example, based on the characteristics of the hard drive (e.g., seek time, block size, rotation speed, . . . etc) and the system (e.g., the number of concurrent streams being processed) a particular chunk of data may be the most efficient size for writing to the hard drive (e.g., 100 Kbytes).

In addition to the PID packet size limitations described above, current transmission systems are also limited to transmitting multimedia streams in legacy frequency bands, so that the streams can be processed by legacy receivers. For example, 64/256 QAM signals are typically transmitted within a plurality of 6 MHz frequency blocks. Tuners employed in current systems are configured to lock on to one of the 6 MHz frequency blocks and extract the underlying QAM signal.

In one embodiment of the invention, multimedia streams are transmitted using larger carrier frequency blocks (e.g., 30 MHz). One benefit of using larger blocks is that fewer (if any) guard bands are required to separate the blocks, thereby freeing up additional bandwidth (guard bands are required to separate each frequency block so that the boundaries for each block may be identified). In addition, if 24 to 36 channels may be transmitted per 6 MHz block using advanced compression (as described above) then more than 5 times this amount may be transmitted in a 30 MHz block, resulting in more than 120 to 144 channels per block (more than 5 times the number of channels may be transmitted because of the bandwidth freed up from the guard bands).

Figure 21:
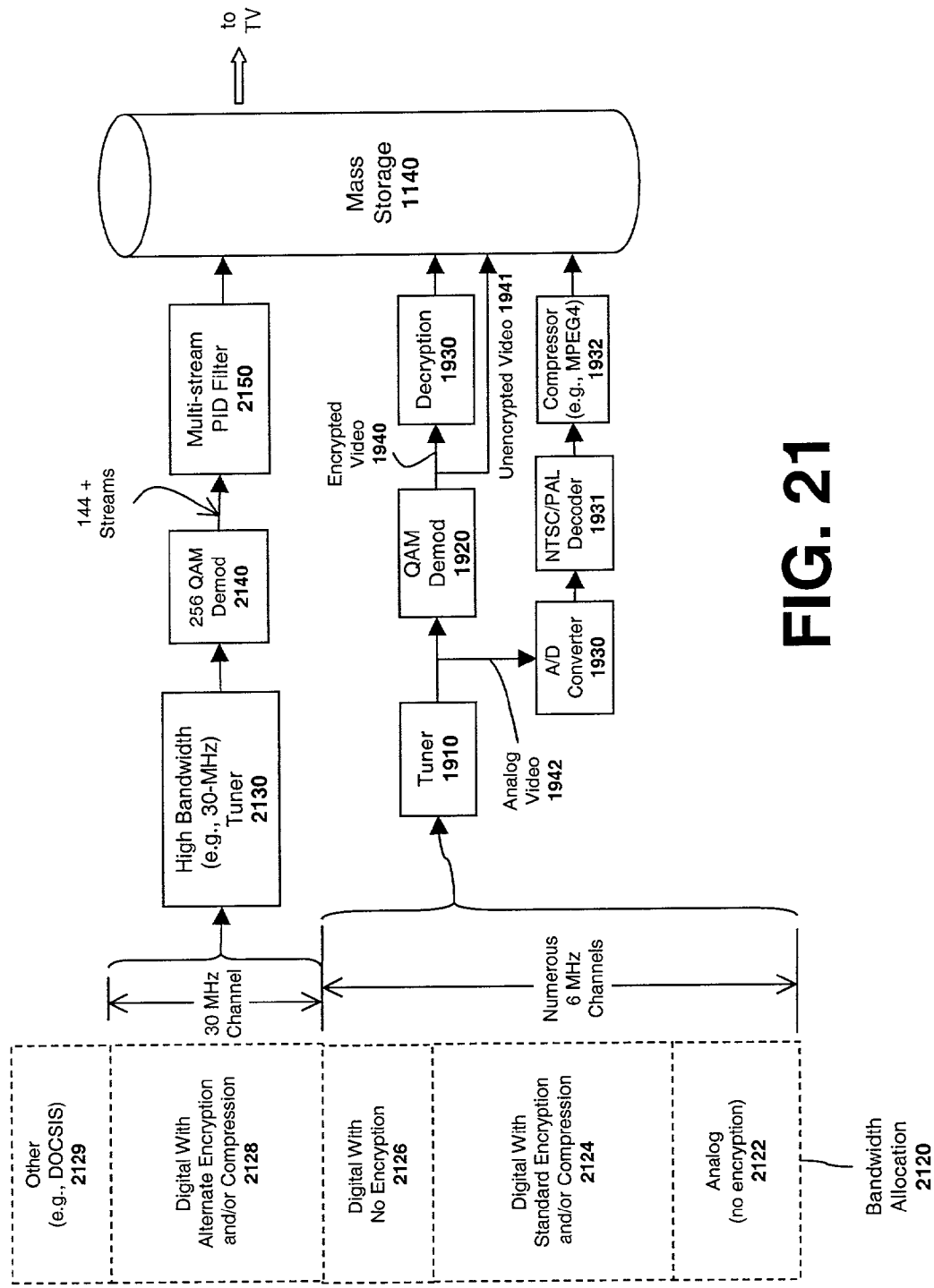
FIG. 21 illustrates an embodiment which transmits multimedia content over wider frequency blocks.

As illustrated in FIG. 21, in one embodiment, a high bandwidth tuner 2130 is employed to lock on to a frequency block which is wider than that typically used in cable systems. For example, if a 30 Mhz frequency block is designated, 144 (or more) channels may be transmitted within it, representing all of (or a significant portion of) the premium and/or basic digital channels transmitted over the cable network. As such, a high bandwidth tuner 2130 employed in this embodiment may be configured to lock on to the designated frequency block at all times. Because the tuner in this embodiment may only be required to lock to a single frequency band, it may be less expensive than a tuner capable of quickly jumping from one frequency block to the next, as used in prior systems, thereby further reducing system costs.

As indicated in FIG. 21, a separate tuner 2135 may also be configured to receive analog and digital channels transmitted over the 6 Mhz frequency blocks. As described above, analog streams may be processed by an A/D converter module 1930, an NTSC/PAL decoder module 1931 and a digital compression module 1932. However, in one embodiment, the analog channels may be digitally simulcast using alternate compression and/or encryption techniques and processed by the high bandwidth tuner 2130 along with the other digital content. As such, in this embodiment, a separate standard tuner 2135 may not be required (i.e., depending on the number of streams the high bandwidth tuner 2130 is capable of receiving).

Figure 22:
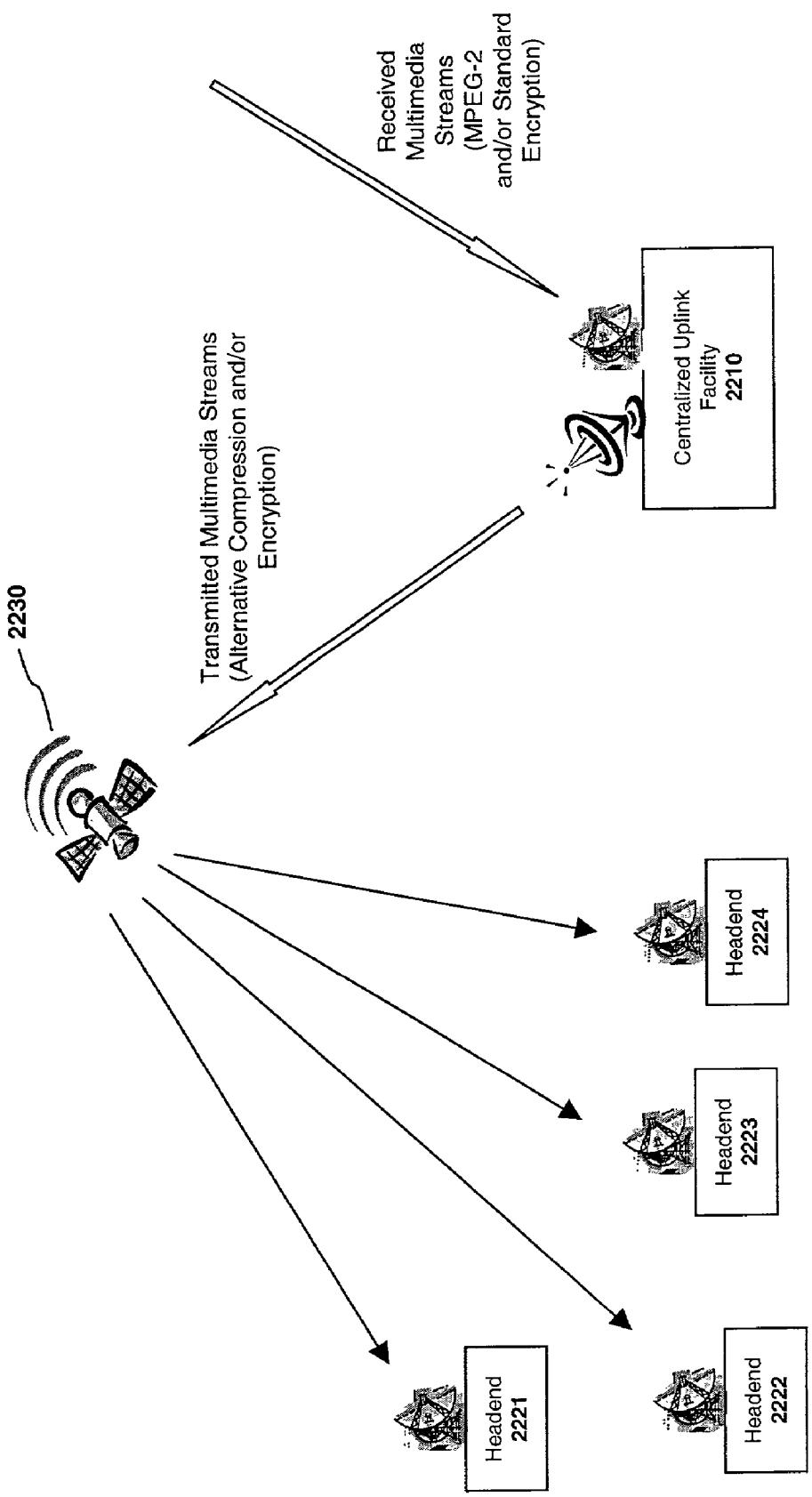
FIG. 22 illustrates a centralized uplink facility according to one embodiment of the invention.

As illustrated in FIG. 22, in one embodiment, a centralized uplink facility 2210 receives the video feeds directly from the content providers, processes the video feeds as described above, and transmits the processed video feeds to various headend systems 2221-2224. For example, the centralized uplink facility 2210 may receive standard MPEG-2 video streams, decompress and recompress the video streams using MPEG-2 decompression modules and alternate compression modules, respectively, and simulcast the streams to the headend systems 2221-2224 in both MPEG2 compression and alternate compression formats (as described above with respect to the individual headend systems). Similarly, the centralized uplink facility 2210 may encrypt the streams using various alternate encryption techniques described above before transmitting the streams to the headend systems 2221-2224.

Processing video streams at a centralized point within the cable network will reduce the equipment cost at each headend, thereby significantly reducing costs for the entire network. For example, if MPEG-2 video streams are converted to an alternative compression format at the centralized uplink facility, then separate MPEG-2 decoder modules will not be required at each individual headend. Similarly, if alternative encryption is performed at the centralized uplink facility, then separate alternate encryption modules will be required at each headend.

While only a single centralized uplink facility 2210 is illustrated in FIG. 22, two or more centralized uplink facilities 2210 may be configured to process video streams for two or more specified groups of headends. Moreover, although communication between the centralized uplink facility 2210 and the headends illustrated in FIG. 22 is provided via satellite 2230, it should be noted that various other configurations are contemplated within the scope of the present invention. For example, certain headends may communicate with the centralized uplink facility 2210 via wired network channels (e.g., fiber optic cable) as well as alternate wireless channels (e.g., radio frequency broadcast channels).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, storage media such as floppy diskettes, optical disks, CD-ROMs, and magneto-optical disks, ROMs, RAMs, EPROMs, EEPROMs, magnet or optical cards, or propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the system and method may be practiced without some of these specific details. For example, while the embodiments described above focused on specific frequency blocks for implementing aspects of the present invention (e.g., 30 MHz), various other frequency block sizes may be employed. Similarly, while specific encryption and compression types were described above (e.g., MPEG-4, Real Video 8, DES encryption, . . . etc) various other encryption and/or compression algorithms may be employed while still complying with the underlying principles of the invention.

In other instances, well known structures and functions were not described in elaborate detail in order to avoid obscuring the subject matter of the present invention. For example, although not illustrated, it will be appreciated that various levels of buffering may be included in the embodiments described herein. For example, in the embodiment illustrated in FIG. 11, buffers (e.g., SDRAM, RDRAM, . . . etc) may be configured between the QAM/DPSK modules 1130, 1131 and the mass storage device 1140 and/or between the mass storage device 1140 and the PID filters 1150, 1151. In fact, buffers may be provided in this manner between any of the system modules in order to improve system performance. The buffers may be separate, independent modules and/or may be assigned blocks of addressable space within a single unified memory (e.g., a RAM module shared between the CPU 1185 and other system components). The underlying principles of the invention remain the same regardless of which types of buffers are used.

For the foregoing reasons, the scope and spirit of the invention should be judged in terms of the claims which follow.

What is claimed is:

1. A machine-readable storage medium having program code stored thereon which, when executed by a processor, cause said processor to perform the operations of:
   encrypting a first group of unencrypted multimedia channels using conditional access ("CA") encryption to produce a first group of encrypted multimedia channels;
   encrypting said first group of unencrypted multimedia channels using a different type of encryption to produce a second group of encrypted multimedia channels; and
   simulcasting said first group of encrypted multimedia channels simultaneously with said second group of encrypted multimedia channels to a plurality of multimedia subscribers having either a new multimedia receiver or a legacy multimedia receiver, said second group of encrypted multimedia channels being decryptable by said new multimedia receivers and said first group of encrypted multimedia channels being decryptable by said legacy multimedia receivers.

2. The machine-readable storage medium as in claim 1 wherein said different type of encryption is digital video broadcast ("DVB") encryption.

3. The machine-readable storage medium as in claim 1 wherein said first group of unencrypted multimedia channels are subscription based channels.

4. The machine-readable storage medium as in claim 1 having program code stored thereon to cause said processor to perform the additional operations of:
   compressing said first group of encrypted multimedia channels using a first compression type and said second group of encrypted multimedia channels using a second compression type.

5. The machine-readable storage medium as in claim 4 wherein said first compression type is MPEG-2.

6. The machine-readable storage medium as in claim 5 wherein said second compression type is MPEG-4.

7. The machine-readable storage medium as in claim 1 having program code stored thereon to cause said processor to perform the additional operations of:
   transmitting a second group of unencrypted multimedia channels in an unencrypted format.

8. The machine-readable storage medium as in claim 7 wherein said second group of unencrypted multimedia channels are basic cable channels and said first group of unencrypted multimedia channels are subscription-based cable channels.

9. The machine-readable storage medium as in claim 8 having program code stored thereon to cause said processor to perform the additional operations of:
   encrypting a first subset of said basic cable channels using said first type of encryption to produce a first group of encrypted basic cable channels;
   encrypting said first subset of said basic cable channels using said different type of encryption to produce a second group of encrypted basic cable channels; and
   concurrently transmitting said first group of encrypted basic cable channels with said second group of encrypted basic cable channels to said plurality of multimedia subscribers.

10. The machine-readable storage medium as in claim 9 having program code stored thereon to cause said processor to perform the additional operations of:
    transmitting a second subset of said basic cable channels in an unencrypted format.

11. The machine-readable storage medium as in claim 10 having program code stored thereon to cause said processor to perform the additional operations of:
    regularly transferring channels from said first subset of basic cable channels to said second subset of basic cable channels and channels from said second subset of basic cable to said first subset of basic cable channels.

12. A headend system for processing multimedia streams comprising:
    a first encryption module to encrypt a plurality of first multimedia streams using conditional access ("CA") encryption; and
    a second encryption module to encrypt said same plurality of first multimedia streams using a different type of encryption; and
    a quadrature amplitude modulation module to modulate said plurality of first multimedia streams encrypted in both CA encryption and said different type of encryption for simulcasting to a plurality of multimedia subscribers at the same time, the plurality of multimedia subscribers having either a new multimedia receiver or a legacy multimedia receiver, each new multimedia receiver being capable of decrypting said plurality of first multimedia streams encrypted in said different type of encryption and each legacy multimedia receiver being capable of decrypting said plurality of first multimedia streams encrypted in said CA encryption.

13. The headend system as in claim 12 wherein said different type of encryption is digital video broadcast ("DVB") encryption.

14. The headend system as in claim 12 wherein said plurality of first multimedia streams are premium cable channels.

15. The headend system as in claim 12 further comprising:
    a first compression module to employ a first type of compression on said plurality of first multimedia streams encrypted using said first compression type; and
    a second compression module to employ a second type of compression on said plurality of first multimedia streams encrypted using said second compression type.

16. A computer-implemented method for processing multimedia channels comprising:
    encrypting a number of unencrypted multimedia channels at a headend using condition access ("CA") encryption to produce a first group of encrypted multimedia channels;

simultaneously encrypting the same unencrypted multimedia channels at the headend using a different type of encryption to produce a second group of encrypted multimedia channels;

simulcasting said first group of encrypted multimedia channels with said second group of multimedia channels at the same time from the headend to a plurality of multimedia subscribers each having either a new multimedia receiver or a legacy multimedia receiver, each new multimedia receiver being capable of decrypting said second group of encrypted multimedia channels and each legacy multimedia receiver being capable of decrypting said first group of encrypted multimedia channels.

17. A system comprising:

means for encrypting first channels using both conditional access ("CA") encryption and a different form of encryption; and means for simulcasting said first channels encrypted in both CA encryption and said different form of encryption to subscribers simultaneously, the subscribers having either a new multimedia receiver or a legacy multimedia receiver, said first channels encrypted using said different form of encryption being decryptable by said new multimedia receivers and said channels encrypted using said CA encryption being decryptable by said legacy multimedia receivers.

18. A method for deploying new multimedia receivers comprising:

encrypting a first set of channels using a first type of encryption;

encrypting said first set of channels using a second type of encryption; and simultaneously broadcasting said encrypted sets of channels that have been respectively encrypted in said first type of encryption and said second type of encryption to subscribers having either a new multimedia receiver or a legacy multimedia receiver;

said channels encrypted using said second type of encryption being decryptable by said new multimedia receivers and said channels encrypted using said first type of encryption being decryptable by said legacy multimedia receivers.

19. The method as in claim 18 further comprising:

transmitting a specified group of channels using no encryption.

20. The method as in claim 19 wherein said specified group of channels comprise basic cable channels and said first set of channels comprise premium channels.

* * * * *